(12) United States Patent
Bohn et al.

(10) Patent No.: US 7,289,104 B2
(45) Date of Patent: Oct. 30, 2007

(54) OPTICAL PROJECTION SYSTEM FOR COMPUTER INPUT DEVICES

(75) Inventors: David D. Bohn, Fort Collins, CO (US); Thomas C. Oliver, Windsor, CO (US); Rajeev Badyal, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 10/722,418

(22) Filed: Nov. 28, 2003

(65) Prior Publication Data

US 2005/0116928 A1   Jun. 2, 2005

(51) Int. Cl.
*G09G 5/00*   (2006.01)

(52) U.S. Cl. .................. 345/156; 345/157; 345/163; 345/164; 345/165; 345/166

(58) Field of Classification Search .. 178/18.01–18.09; 345/156, 157, 163–168, 179
See application file for complete search history.

(56) References Cited

U.S. PATENT DOCUMENTS

| | | | |
|---|---|---|---|
| 5,057,827 A | | 10/1991 | Nobile |
| 5,526,481 A | * | 6/1996 | Parks et al. ................ 715/784 |
| 6,133,907 A | * | 10/2000 | Liu ............................ 345/183 |
| 6,249,998 B1 | * | 6/2001 | NakaMats .................... 40/452 |
| 6,489,934 B1 | * | 12/2002 | Klausner ..................... 345/1.1 |
| 6,707,027 B2 | * | 3/2004 | Liess et al. .................. 250/221 |
| 6,882,331 B2 | * | 4/2005 | Wu ............................... 345/82 |
| 6,921,170 B1 | * | 7/2005 | Nevermann .................. 353/28 |
| 6,945,725 B2 | | 9/2005 | Cui |
| 7,098,894 B2 | * | 8/2006 | Yang et al. ................. 345/166 |
| 2004/0189604 A1 | | 9/2004 | Lee |

OTHER PUBLICATIONS

Logitech Cordless Mouse Color Select, 2 sheets, www.logitech.com; Nov. 15, 2003.
3 Color Photo Sheets of Microsoft IntelliMouse Explorer, 2000.
1 Color Photo Sheet of Optical Mouse Blue, Microsoft, Sep. 2002.
Projection U. S. Atomic Alarm Clock-Clear, 1 Color Sheet, www.sharperimage.com; Nov. 23, 2003.

(Continued)

*Primary Examiner*—Richard Hjerpe
*Assistant Examiner*—Jennifer T Nguyen
(74) *Attorney, Agent, or Firm*—Banner & Witcoff, Ltd.

(57) ABSTRACT

A computer input device, such as an electronic mouse, having an optical projection system. The optical projection system is configured to project an image onto a supporting surface upon which the device rests. In one arrangement the optical projection system includes a light source, an image forming light blocker and optics. The optics may be collimating or non-collimating. In another arrangement the optical projection system may include an active LED matrix display. This system enables a use to personalize and/or customize his or her computer input device. Additionally, it permits the device to serve desirable notification functions if one or more of various events have occurred in a computer application being run on the computer. An example of event for notification includes the receipt of a message in a communications program such as an e-mail message.

33 Claims, 18 Drawing Sheets

OTHER PUBLICATIONS

Projection U. S. Atomic Alarm Clock with Projected Outdoor Temperature, 1 Color Sheet, www.sharperimage.com; Nov. 23, 2003.

Projection U. S. Atomic Alarm Clock with Cool Blue Digits, 1 Color Sheet, www.sharperimage.com; Nov. 23, 2003.

Mini Projection Clock, 1 Color Sheet, www.sharperimage.com; Nov. 23, 2003.

Info Globe Scrolling LED Message Center with Caller ID, 1 Color Sheet, www.sharperimage.com; Nov. 23, 2003.

* cited by examiner

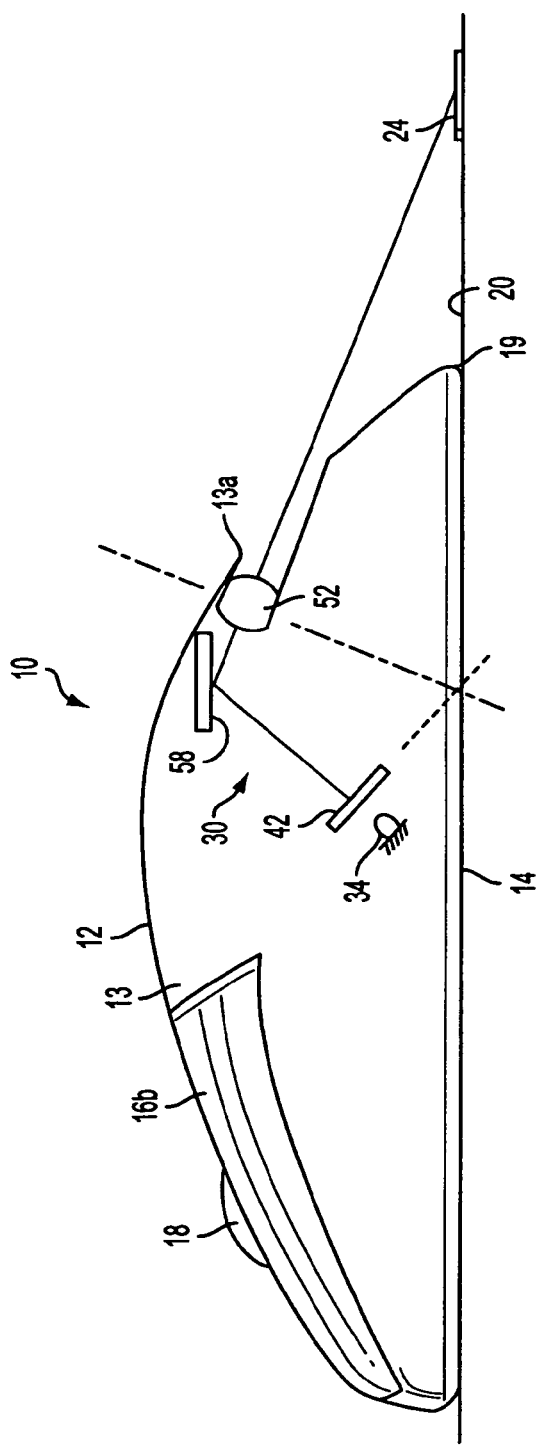
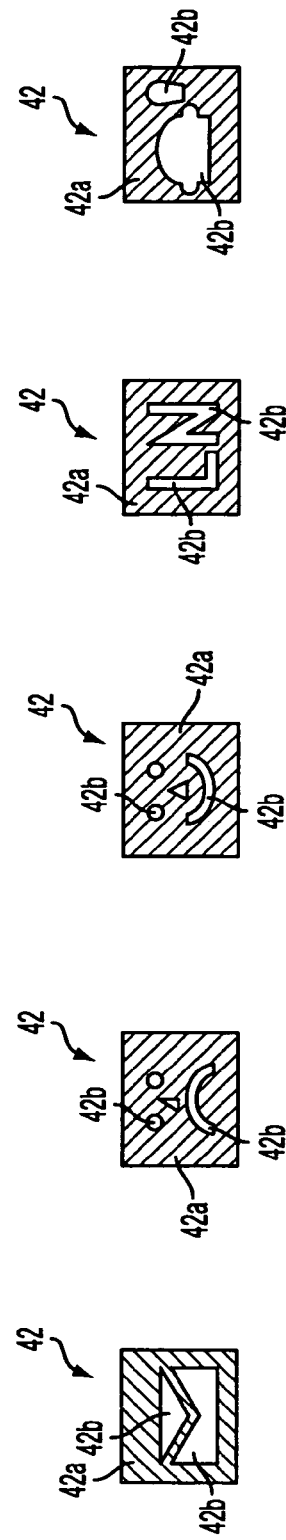

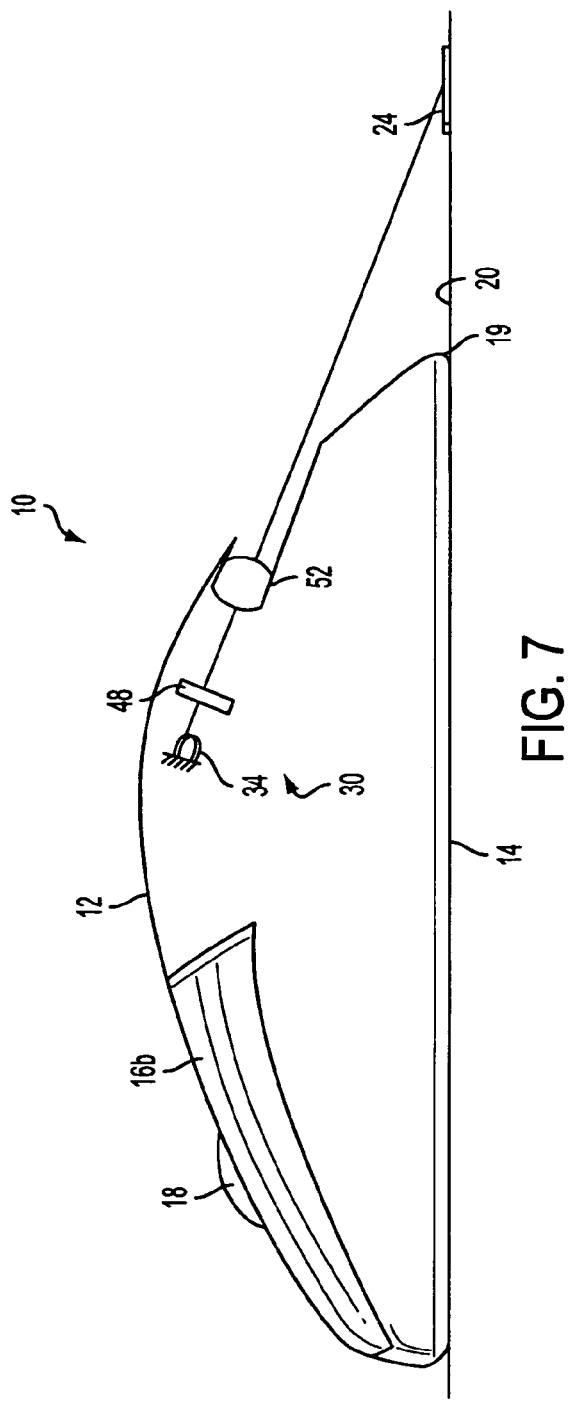
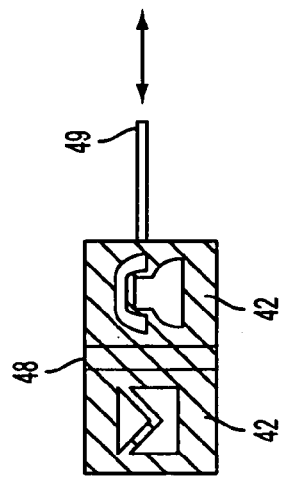
FIG. 7
FIG. 8

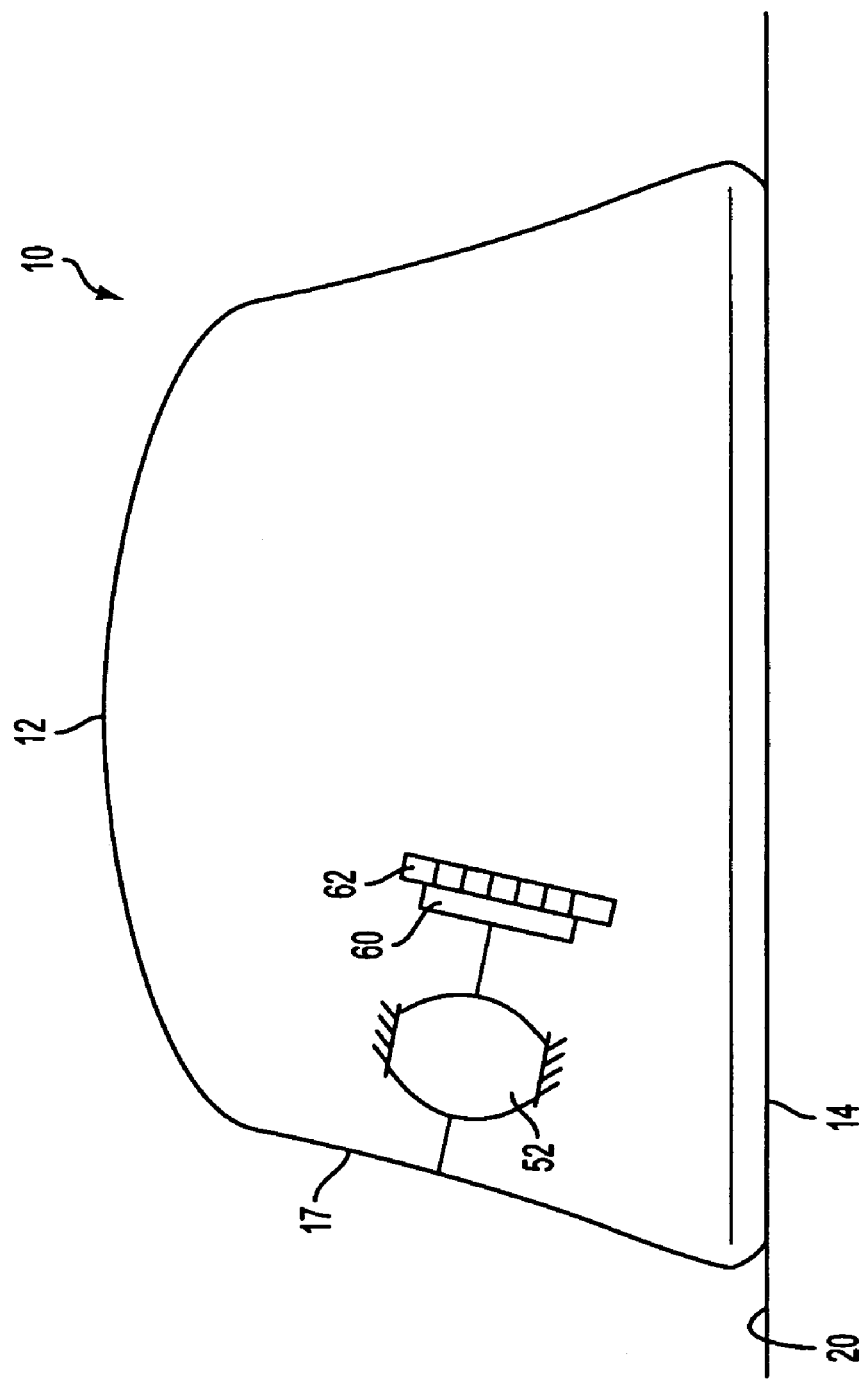

OPTICAL PROJECTION SYSTEM FOR COMPUTER INPUT DEVICES

FIELD OF THE INVENTION

The present invention relates to a computer input device having an optical projection system. More specifically, the present invention relates to an optical projection system for a computer input device to display visual indicia or another image to a user.

BACKGROUND OF THE INVENTION

Many people feel that the design and appearance of consumer products are a reflection on the users of the products. Additionally, many users prefer and/or enjoy customizing their consumer products, and the more they use these products the more they are apt to want to customize their products. Computer input peripherals such as electronic mice, trackballs, and keyboards may be included within this set of consumer products. Indeed, numerous different designs for these products are commercially available. Further, some of these products are available in different colors. A mouse design made by Logitech® may be purchased with three interchangeable faceplates, with each faceplace being made of a different colored plastic. However, some may feel that attempts to date to personalize and/or customize computer input devices have been less than ideal and/or may not suit their preferences.

Many computer communication systems, such as e-mail programs, are currently used. Some of these programs have notification features. Typically, with a notification feature of the program in an active mode, the receipt of an e-mail may cause an icon or user interface to appear on the display device or may cause the computer to produce an audible signal. However, such icons and visual indicators take up valuable display area, and both the visual and audible indicators can sometimes be annoying, even to the point where many users disable such features.

Therefore, it would be advantageous for computer input devices to provide a more personalized and/or customized appearance, and/or to maximize functions, such as a user notification function, whereby the user may be notified of various events in a desirable and visually appealing manner.

BRIEF SUMMARY OF THE INVENTION

In view of the foregoing, an aspect of the present invention provides a computer input device that includes an optical projection system. The optical projection system may be substantially contained within the housing of the computer input device and is oriented and configured to display an image or pattern on a surface supporting the computer input device. This arrangement provides an alternative and unique method for a user to personalize and customize the computer input device. The manufacturer or other supplier may configure the image for its own branding purposes or for branding by a customer.

In another aspect, the optical projection system provides an alternative and unique method to notify a user of various events. This may be accomplished by changing states of an illumination member, changing displayed graphical images on the supporting surface, and/or by displaying different alphanumeric characters.

In one aspect, an improved computer input device is configured to rest on a supporting surface. The computer input device includes a housing having a lower periphery and an image projection system. The image projection system is configured to display an image on the supporting surface adjacent to and outside of the periphery when the computer input device is resting on the supporting surface.

According to another aspect, a computer mouse includes a housing, a plurality of actuators mounted on the housing, and an optical projection system. The optical projection system includes a light source and a movable image forming element located within the housing.

According to another aspect of the present invention, a computer input device includes a method of notifying a user of an occurrence via a computer peripheral device. A first image is projected onto a display region, and upon a predetermined condition associated with a computer program, a second image, different from the first image, is projecting onto the display region.

These and other objects and features of the present invention will be apparent upon consideration of the following detailed description of preferred embodiments thereof, presented in connection with the following drawings in which like reference numerals identify like elements throughout.

BRIEF DESCRIPTION OF THE DRAWINGS

The present invention will be described in detail herein with reference to the attached drawings, wherein:

FIG. 2 is a schematic partial side sectional view of the electronic mouse of FIG. 1.

FIGS. 3*a*-3*e* show pattern light blocking devices with alternative patterns.

FIG. 7 is a schematic partial side sectional view of an electronic mouse with an image projection system having linearly movable multiple pattern light blocking devices.

FIG. 8 show pattern light blocking devices for use with the embodiment of FIG. 7.

FIG. 18b is a schematic partial rear side sectional view of the electronic mouse of FIG. 18a showing an alternative image projection system.

DETAILED DESCRIPTION OF THE INVENTION

Figure 1:
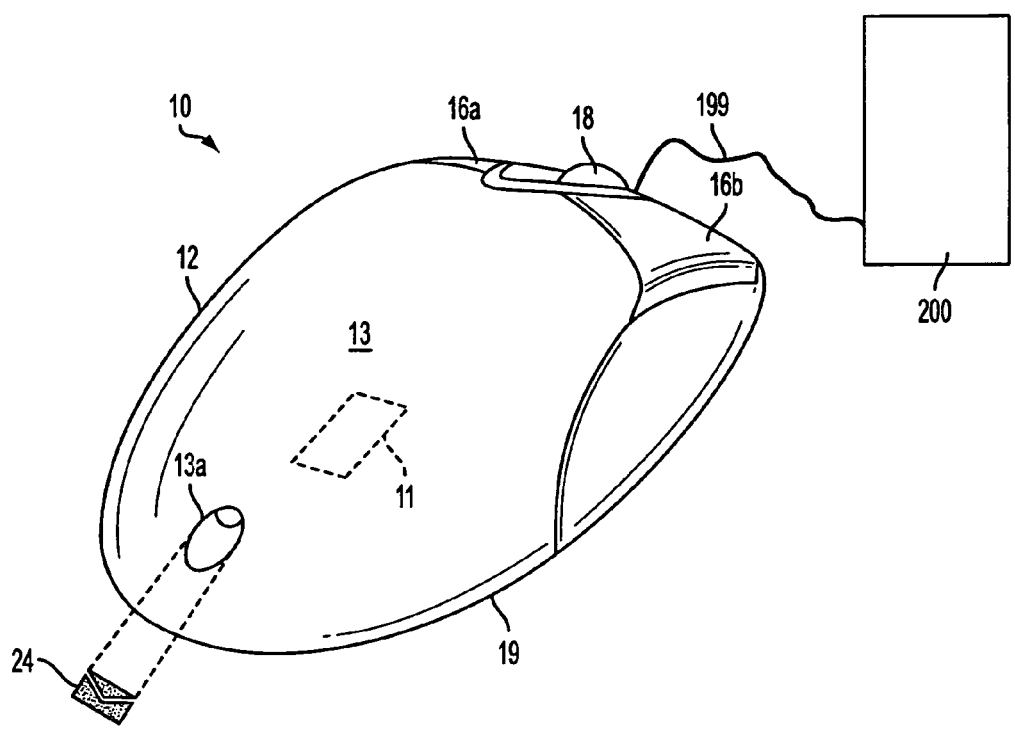
FIG. 1 is a rear perspective view of an electronic mouse type computer input device having an image projection system.

The device with the image projection system is depicted in the figures as being incorporated into a computer input device, which, in one embodiment, is a pointing device, particularly a computer mouse. In addition to the mouse-style pointing device, the image projection system can also be incorporated into other types of computer-related input devices in non-depicted embodiments, including a trackball pointing device, a touchpad pointing device, and a keyboard, for example. Within the scope of the present invention, however, the image projection system may also be incorporated into a plurality of other computer-related input devices, such as the bezel of a personal data assistant or handheld computing device, a web pad or other Internet appliance, a gaming controller, or a chassis of a notebook computer, for example. Thus the type of device in which the image projection system is incorporated into is not limited, therefore, to the precise examples embodied in the drawings, but may be incorporated into a variety of devices to provide the functions discussed herein.

Referring to the figures, the image projection system is incorporated in a mouse type computer peripheral device and the mouse is generally designated by reference numeral 10. As used herein, the terms "mouse", "electronic mouse", and "computer mouse" are commonly used to refer to a computer input mouse design having a tracking system such as, but not limited to, a lower mounted ball or an optical tracking system, for determining the relative movement between the mouse and a surface upon which it rests. The mouse device 10 transmits signals generated by a movement sensor and may be used to control a geographical pointer or a display of a computer system. In use, the mouse 10 is connected to a computer 200 and provides signals to the computer 200 and can control a cursor or other object on a monitor.

The connection may be via a cable 199, such as a cable with a USB connection, or may be a wireless connection using a wireless transmitter and receiver as is known in the art. If a cable with a USB connection is provided, the cable 199 may carry power and/or signals from the computer 200 to the mouse 10. Alternatively and/or additionally, the mouse may include a power supply.

The mouse device 10 preferably includes a housing 12 having a substantially flat bottom surface 14 such that it is configured to rest on a flat supporting surface 20. The mouse 10 further includes a periphery 19 defined at its bottom outer edge. The housing 12 further includes an upper body 13 shaped to interface with and preferably support the human hand. The mouse also includes a movement sensing system 11 that determines the relative movement between the supporting surface 20 and the mouse 10. In a first embodiment, movement sensing system 111 may include a movable ball that can be rotatably mounted in the bottom of the housing 12. Movement of the rotatable ball may be sensed by any conventional mechanical or optical sensing system, or by any other desired technique. For example, if a mechanical sensing system is used, the ball may be supported on a pair of perpendicular rollers. In a second embodiment, movement sensing system 11 may include a non-ball optical tracking device. In one such arrangement, movement sensing system 11 includes a light source that is directed at the supporting surface 20 through the bottom of the housing 12, and an optical sensor inside of the housing 12 that determines the relative movement between the supporting surface 20 and the mouse 10. Each of these tracking devices and methods as described herein are well known.

The mouse 10 further includes a number of actuators. In the depicted embodiment, a pair of push button actuators 16a and 16b (e.g., primary and secondary keys) and a scroll wheel 18 are provided on the housing body 13. Further, the scroll wheel 18 may be depressible to provide another actuator function. However, it is recognized that alternative numbers, types, and configurations of actuators may be used on mouse 10.

As shown in FIG. 2, the computer input device, e.g., the mouse 10, includes an image projection system 30 that is configured to generate and project an image 24 onto the supporting surface 20 in some depicted embodiments and onto a wall of the housing 12 in other depicted embodiments. The image projection system 30 is preferably separate from the tracking device and is positioned substantially contained inside of the housing 12. The image 24 may be a logo, symbol, character or characters (e.g., letters and numbers), indicia, or any desirable graphical design. Accordingly, the image 24 may be alphanumeric or non-alphanumeric. FIG. 1 illustrates one example where the image 24 is a stylized graphical representation of an envelope.

In an exemplary arrangement, the image projection system 30 includes a light source, an image shaping device, and other optical elements. As shown FIG. 2, the light source may be an LED 34 to produce the light that creates the projected and displayed image 24. In lieu of an LED 34, an incandescent light source or a laser may be used. The image shaping device may be a pattern light former such as a pattern light blocker 42. As used herein, a pattern light blocker 42 is a device that selectively permits and prevents the passage of light there through in a pattern that corresponds to the displayed image 24. The pattern light blocker 42 may define a pattern that is identical to the displayed image 24 or it may define a pattern that is an angularly skewed representation of the displayed image 24. In one arrangement, the pattern light blocker 42 may be a reticule or other thin plate where one or more light transmissive openings are formed therein.

FIGS. 3a-3e illustrate examples of pattern light blockers 42. The pattern light blocker in FIG. 3a would be used to form the image 24 projected in FIG. 1. The pattern light blocker 42, e.g., a reticule, includes one or more light transmissive sections 42b with the remainder of the pattern light blocker 42 preferably being a light blocking section 42a. In this example, there are two light transmissive sections 42b, an upper triangular section and a lower five-sided shape, that forms an image. Thus, when the light from the LED 34 passes through the pattern light blocker 42, the resultant beam is blocked in region 42a and will pass through the two distinct light permissive sections 42b so that the two beam sections correspond to the image 24 to be displayed. This is somewhat similar to the manner in which a stenciled jack-o-lantern permits a desired lighted image.

The light transmissive sections 42b of pattern light blocker 42 may be of any desired configuration so the number of variations of images 24 that can be displayed are virtually limitless. For example, the pattern light blocker 42 may provide a shape to create the image of a personal expressive nature, such as the frowning and smiling face of FIGS. 3b and 3c respectively. Alternatively, the pattern light blocker 42 may include the initials of the user, e.g., LN, as shown in FIG. 3d so that the displayed image is of the initials of the user. In another embodiment, the pattern light blocker 42 may be of a graphical representation, such as a depiction of a hamburger and a drink, when illuminated, to inform passersby that the user is at lunch. Virtually any graphical representation desired by the user may be user to create a graphical image 24 that makes a personal statement, a hobby, an interest, a favorite sports team or character, or one that reflects a notification or other functional purpose.

As described above the light transmissive portion 42b of the pattern light blocker 42 may be formed by air gaps cut, etched, or otherwise formed in a metal or otherwise opaque plate which forms the light blocking section 42a. However, numerous alternative arrangements may be used. For example, a transparent sheet, such as a plastic or glass, may be used with paint, or light blocking materials to form the light blocking section 42a. In an alternative arrangement, not shown, the image forming structure can be formed by a reflective surface in lieu of the light transmissive portion 42b. In this arrangement, the pattern light former 42 is actually a pattern light reflector and such would be angled relative to the light source to reflect the desired pattern.

If desired, optical elements such as one or more lenses 52 may be used to affect the spot of the image 24. That is one or more lenses may be used to angle, expand, contract, re-image, or collimate the beam. Thus, the selection of lenses may affect whether the image size is smaller or larger. In one embodiment, as depicted, a convex-convex lens is used which creates a predetermined focal point for the image 24, i.e., a finite conjugate optical system.

Further, based on the criteria of the other elements in the image projection system 30, the lens or lenses 52 may affect whether the displayed image 24 is angularly distorted. In one arrangement, as shown, the plane of the pattern light blocker 42 and the central axis of the lens 52 perpendicular to the optical line intersect at a point that substantially lies in the plane of the support surface 20. It is noted that the number of lenses and other optical elements, such as mirrors, may affect the desired configuration. Further, if desired, angular distortion can be compensated for in the design of the image blocking device 42.

If desired, the lens, e.g., lens 52, may be disposed in the aperture 13a in the housing 12. This has an added advantage of providing a seal to protect the elements inside of the housing 12 from dust and other contaminates. Further, it may be positioned within a recessed area of the aperture 13a to shield it from inadvertent damage and minimize the possibility of it becoming scratched.

Based in part on the interior space of the housing 12, a reflective surface such as a mirror 58 may be used if desired. In the arrangement as shown in FIG. 2, the mirror 58 is disposed adjacent the top of the inside of the housing 12. This bends the beam (or beam portions if multiple light transmission portions 42b are present) to angle it rearward toward the back of the mouse 10.

Figure 4:
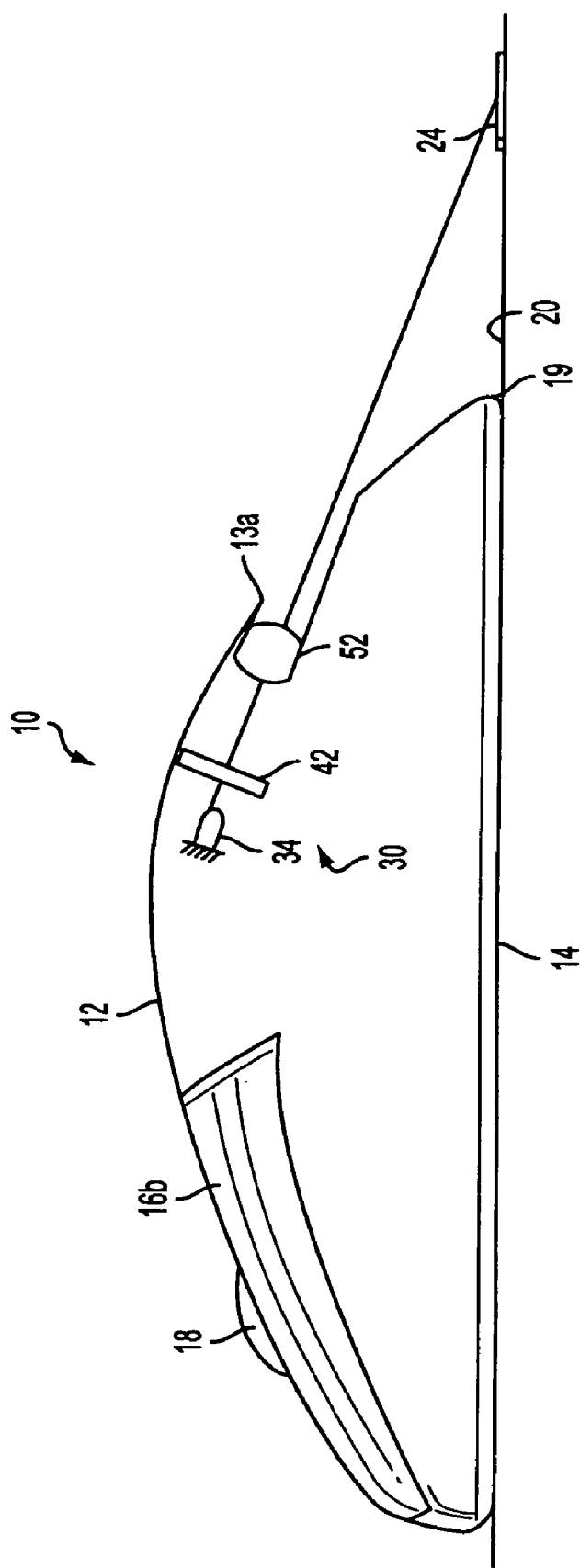
FIG. 4 is a schematic partial side sectional view of an electronic mouse with an alternative image projection system.

In use, in the embodiment depicted in FIG. 2, the LED 34 directs light upward through the light transmissive sections 42b of the pattern light blocker 42. The remainder of the light does not pass through the pattern light blocker 42 due to the light blocking section 42a. The beam portions of light that pass through the light permissive sections 42b reflect off of the mirrored surface 58 and through the lens 52 where it is focused as desired onto the supporting surface 20 to the desired displayed image shape 24. FIG. 4 depicts an arrangement which is similar to that depicted in FIG. 2 except that no mirrored surfaces to change the angle of the beam are used.

In an exemplary embodiment, the pattern light blocker 42 is a single static device located within the housing 12. It may be fixed in that location. Alternatively, the pattern light blocker 42 may be removably coupled to the housing 12 such that the user may remove one pattern light blocker 42 and replace it with another. In one arrangement, the pattern light blocker 42 may be accessible via a slot or removable access door, not shown, in the housing 12.

Figure 5:
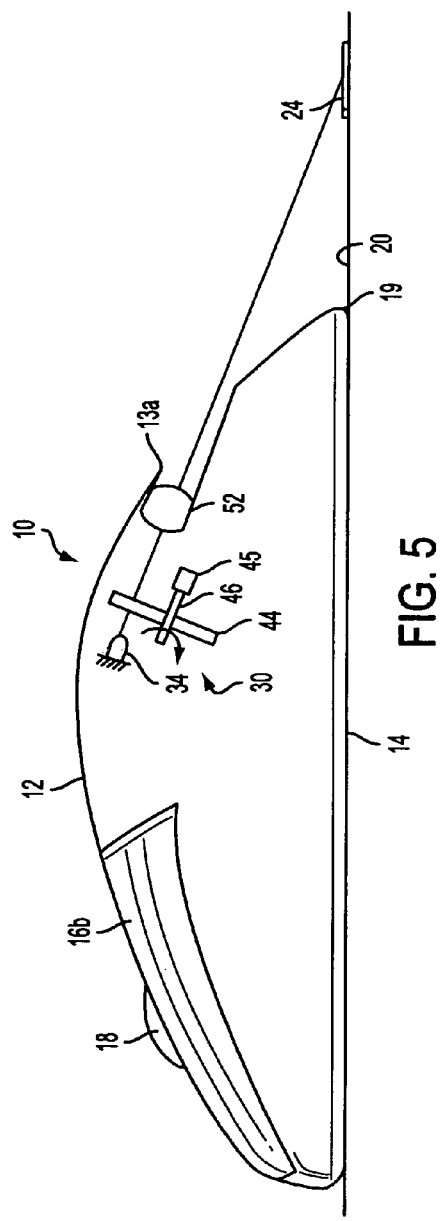
FIG. 5 is a schematic partial side sectional view of an electronic mouse with an image projection system having rotatable multiple pattern light blocking devices.
Figure 6A:
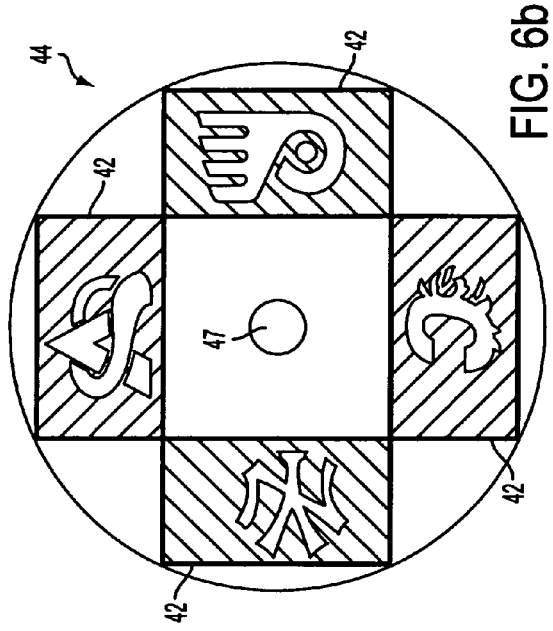
FIGS. 6*a*-6*b* show pattern light blocking devices for use with the embodiment of FIG. 5.
Figure 6B:
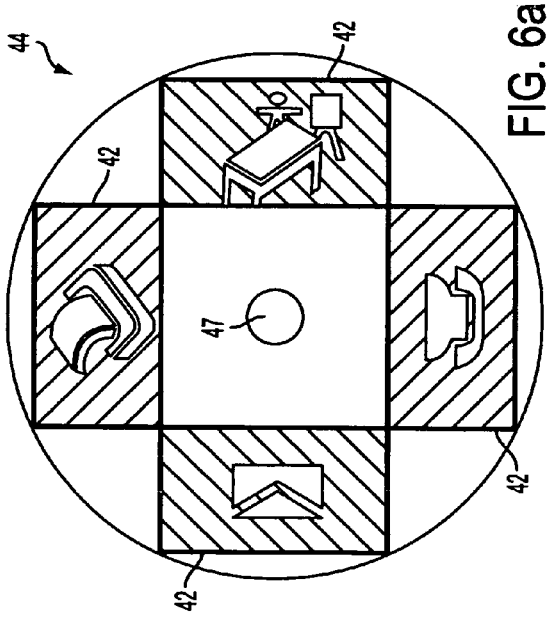

FIG. 5 illustrates another exemplary arrangement wherein multiple pattern light blockers 42 are disposed on a movable holder 44. More specifically, as shown in FIGS. 6a and 6b, the holder 44 includes multiple angularly displaced pattern light blockers 42 and a central hole 47. The holder 44 is coupled to a motor 45 and an axle 46. The axle 46 preferably is coupled to and extends through the hole 47 in the holder 44. The motor 45 may be angularly controlled such that one of the pattern light blockers 42 is disposed in the optical path at a given time. Thus in the depicted arrangement, the motor 45 is controllable to rotate the holder 44 in 90° increments. In lieu of motor 45, a rotatable solenoid device may be used.

In the holder 44 of FIG. 6a, four pattern light blockers 42 containing graphical symbols that are notification-related are provided. Thus, if the holder 44 is disposed such that the top pattern light blocker 42 is in the optical light path, then the displayed image will represent a facsimile machine. This may be used to notify the user that a facsimile message has been received. If the motor 45 rotates the holder 90° clockwise, pattern light blocker 42 will result in a displayed image of an envelope as shown in FIG. 1 for example. This may be used to notify the user that he or she has received an email message. If the motor 45 rotates the holder 90° clockwise again, the subsequent pattern light blocker 42 will result in a displayed image of a telephone. This may be used to notify the user that he has a voice mail message waiting. Another 90° rotation of the holder 44 by the motor 45 and the final pattern light blocker 42 in the holder 44 will result in a displayed image of a conference room setting. This may be used to notify the user that he or she has a schedule conference upcoming or past due.

In the holder 44 of FIG. 6b, four pattern light blockers 42 containing graphical symbols that are enthusiast or hobby-related are provided. In this example, the pattern light blockers 42 all form logos of sports teams that the user may like. For example, the holder 44 of FIG. 6b includes (clockwise from the top) logos of the Colorado Avalanche® of the National Hockey League®, the New York Yankees® of Major League Baseball®, and the Calgary Flames® and the Philadelphia Flyers® of the National Hockey League®. The user may be able to purchase or otherwise have made a holder 44 containing his or her favorite symbols to be displayed. The user may control the motor 45, as will be described hereinafter, to choose the image to be displayed at any given time. In addition to sports team logos, other graphical designs such as cartoon characters, flags, music groups, etc., may be used. Further, while four 90° displaced pattern light blockers 42 are depicted, more or less may be used.

FIGS. 7 and 8 illustrate an alternative exemplary arrangement wherein multiple pattern light blockers 42 are disposed on a movable holder 44. More specifically, the holder 48 may include multiple linearly displaced pattern light blockers 42. In the depicted arrangement, the pattern light blockers 42 are laterally spaced from each other on a common holder 48. The holder 48 is coupled to a linear actuator 49 such as a solenoid. The actuator 49 may be linearly controlled such that one of the pattern light blockers 42 is disposed in the optical path at a given time. Thus in the depicted arrangement, the actuator 49 is controllable to move the holder 48 between first and second positions. Thus, in the configuration of FIG. 7, the holder 48 is configured and oriented to move in and out of the plane of the figure and laterally relative to the mouse 10. Further, while two linearly displaced pattern light blockers 42 are depicted, more than two may be used and the actuator 49 may have more than two positions. In the holder 48 of FIG. 8, the pattern light blockers 42 will result in a displayed image of a telephone or a displayed image of an envelope based on the position of the actuator 49.

Figure 9:
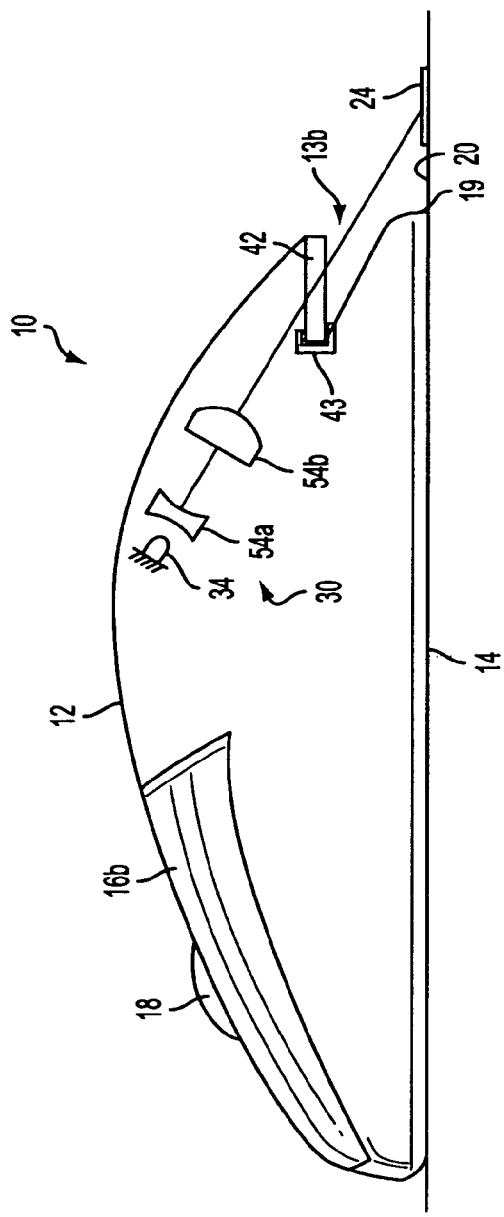
FIG. 9 is a schematic partial side sectional view of an electronic mouse with an alternative image projection system.
Figure 10:
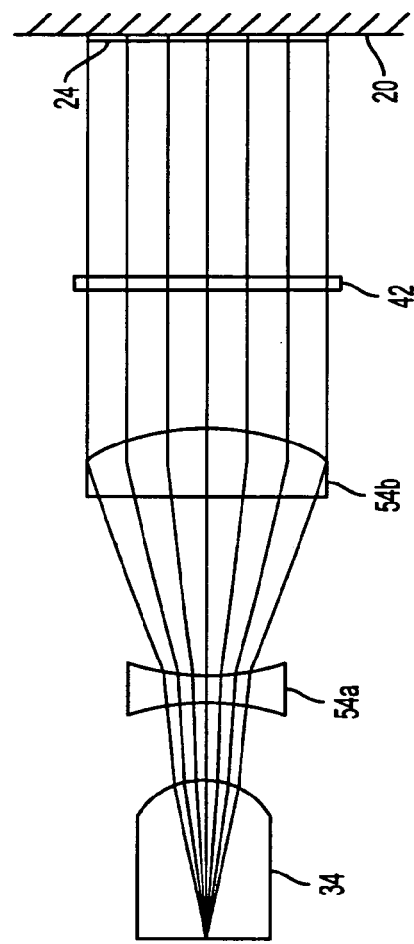
FIG. 10 is a schematic view of the image projecting system used in the embodiment of FIG. 9.
Figure 11:
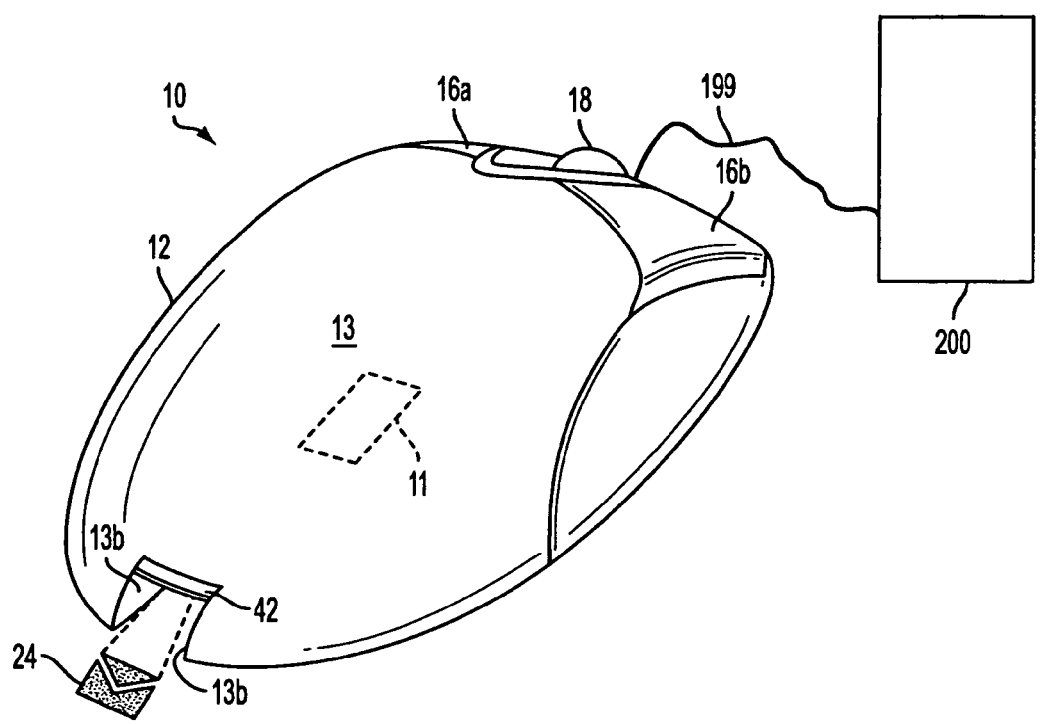
FIG. 11 is a rear perspective view of an electronic mouse type computer input device having the image projection system of FIG. 9.

FIGS. 9-11 illustrate an alternative arrangement of the image projection system 30 wherein the light from the LED 34 is collimated by optics. In an exemplary arrangement, the light is collimated by a pair of optical lenses 54*a* and 54*b*. As schematically depicted in FIG. 10, the first lens 54*a*, a concave-concave lens, expands the beam. The then-expanded beam reaches the second lens 54*b*, a planar-convex lens that collimates the beam. The collimated beam then passes through a pattern light blocker 42 and casts an image 24 onto the supporting surface 20 adjacent the bottom periphery 19 of the mouse 10. If desired, as can be seen in FIGS. 9 and 11, the aperture 13*b* is slightly enlarged and extended to the bottom of the mouse 10 if desired, to form a notch. The pattern light blocker 42 closes the opening to internal components and effectively provides a seal to protect the elements inside of the housing 12 from dust and other contaminates. Further, it may be positioned within a recessed area of the aperture 13*b* to shield it from inadvertent damage and minimize the possibility of it becoming scratched.

Additionally, the pattern light blocker 42 may be externally accessible and removably coupled to a bracket 43. For example, it may be possible for the user to slide the pattern light blocker 42 into and out of its in-use position. The pattern light blocker 42 and the bracket 43 may create a snap-fit or friction-fit relationship to prevent inadvertent movement of the pattern light blocker 42. In another arrangement, a transparent element may be provided in the depicted position of pattern light blocker 42 and the user may affix and remove overlays such as decals or stickers with transparent and translucent portions to create a pattern light blocker 42.

Figure 12:
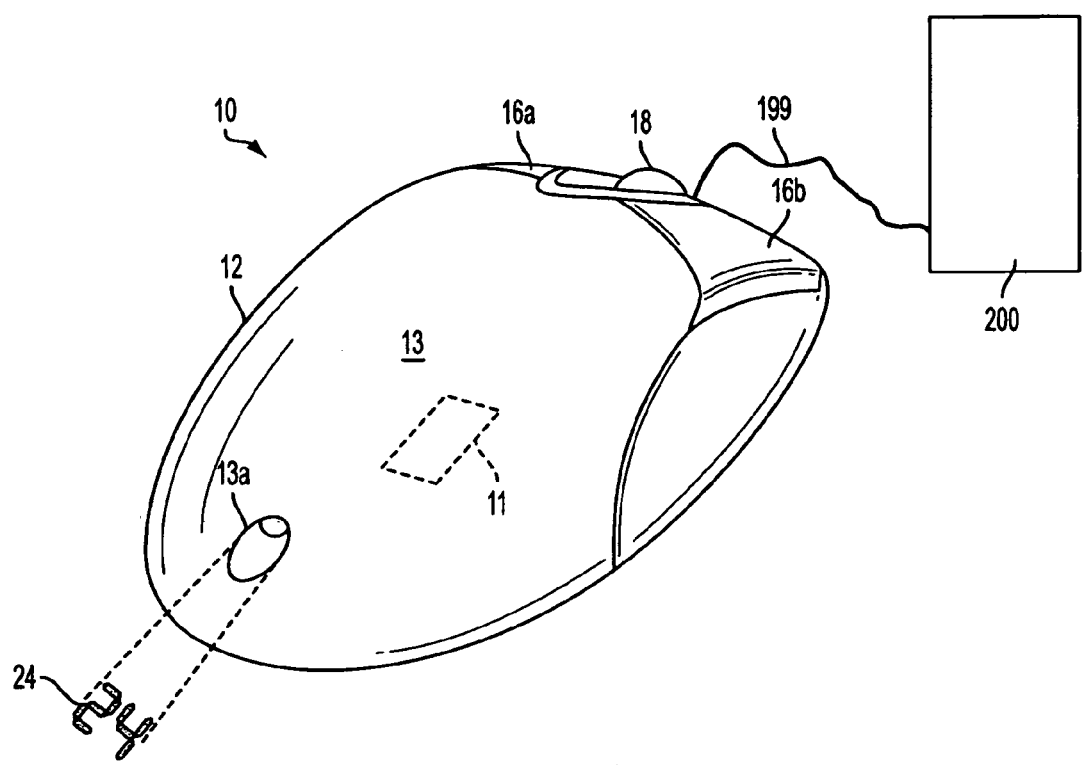
FIG. 12 is a rear perspective view of an electronic mouse with an alternative image projection system.
Figure 13:
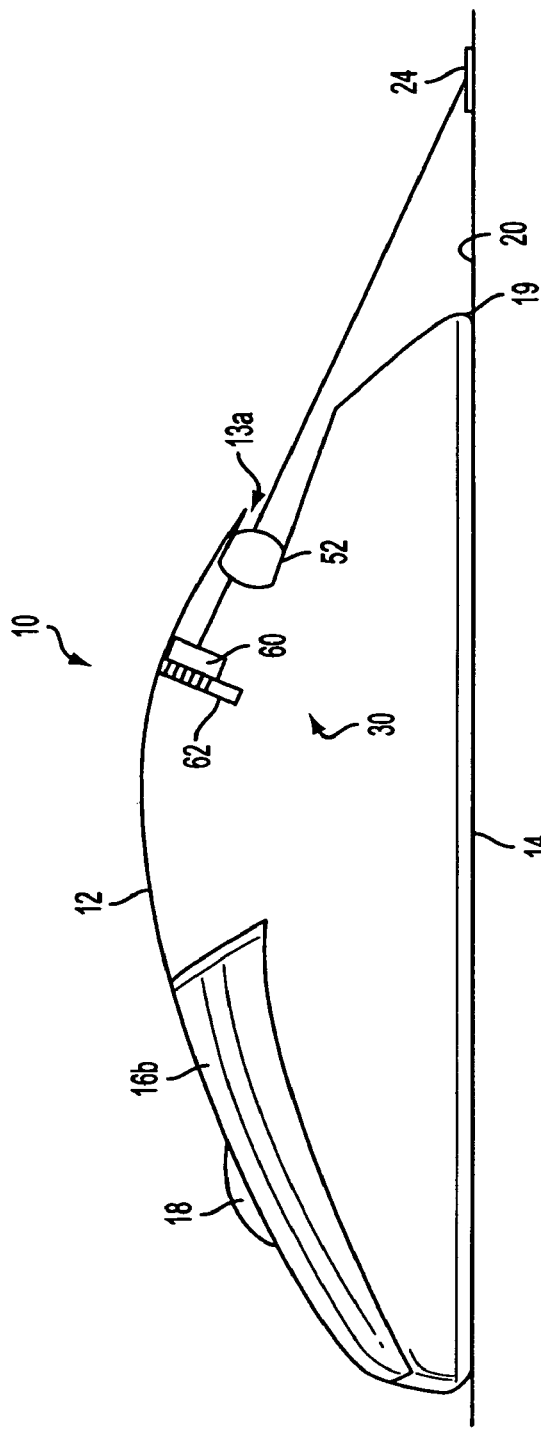
FIG. 13 is a schematic view of the image projection system used in the embodiment of FIG. 12.
Figure 14:
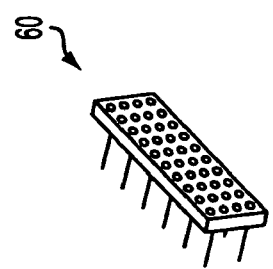
FIG. 14 is an isometric view of a display used in the embodiment of FIG. 12.

FIGS. 12-14 illustrate an alternative arrangement of the image projection system 30 wherein the light is generated by, and the image pattern is created by an active LED matrix display 60. The LED matrix display 60 is an array of small LEDs for display of alphanumeric information. Such active LED matrix displays 60 are commercially available and manufactured by Agilent Technologies, Inc. For example, Agilent Technologies, Inc makes models HDSP-2301-2303 which are four character 5 mm alphanumeric displays each formed by a 5×7 LED array. Active LED matrix display 60 is preferably coupled to a printed circuit board 62 and receives input for display there from. Other models from Agilent Technologies, Inc, such as model HCMS-3966, and from other manufacturers may also be feasible alternatives.

If desired, optics such as lens 52 may be used to focus the alphanumeric characters generated by LED matrix display 60 onto the supporting surface at the desired size. This has an added advantage of providing a seal to protect the elements inside of the housing 12 from dust and other contaminates.

Active LED matrix display 60 may be programmable to display a number that changes to reflect desired notification data. For example, the LED matrix display 60 may be programmed to display the number of received and unopened emails and/or voice mails. For example, FIG. 12 illustrates the display 24 of the numeral 24 that may reflect the number of unopened emails. Thus, if an additional email was received, the LED matrix display 60 can illuminate to display the numeral 25. In another exemplary embodiment, the LED matrix display 60 can scroll messages to the user. For example, the following alphanumeric characters can be scrolled as a display 24 on the supporting surface to indicate that the user has 4 email messages: "YOU HAVE 4 EMAILS". Numerous other alternatives messages may be scrolled by to indicate various notifications.

In all arrangements as described above for projecting an image 24 onto the supporting surface 20, the image projecting systems 30 display the image 24 proximate to the bottom periphery 19 of the mouse 10 and more preferably immediately proximate to the bottom periphery 19 of the mouse 10. In one arrangement, the adjacent edge of the image 24 is spaced between 1 mm and 25 mm from the bottom periphery 19 of the mouse 10. More preferably, the adjacent edge of the image 24 is spaced between 10 and 20 mm from the bottom periphery 19 and the size of the display in the direction from its forward adjacent the mouse 10 to its opposing rearward end is preferably between 5 mm to 15 mm. However, it is recognized that other sizes and distances may alternately be used. Further, while the depicted arrangements illustrate the images 24 extending from the rear of the mouse 10, the image projecting system 30 and housing 12 may be configured and oriented to cast the image 24 on supporting surface 20 at any desired position relative to the mouse 10.

Figure 15:
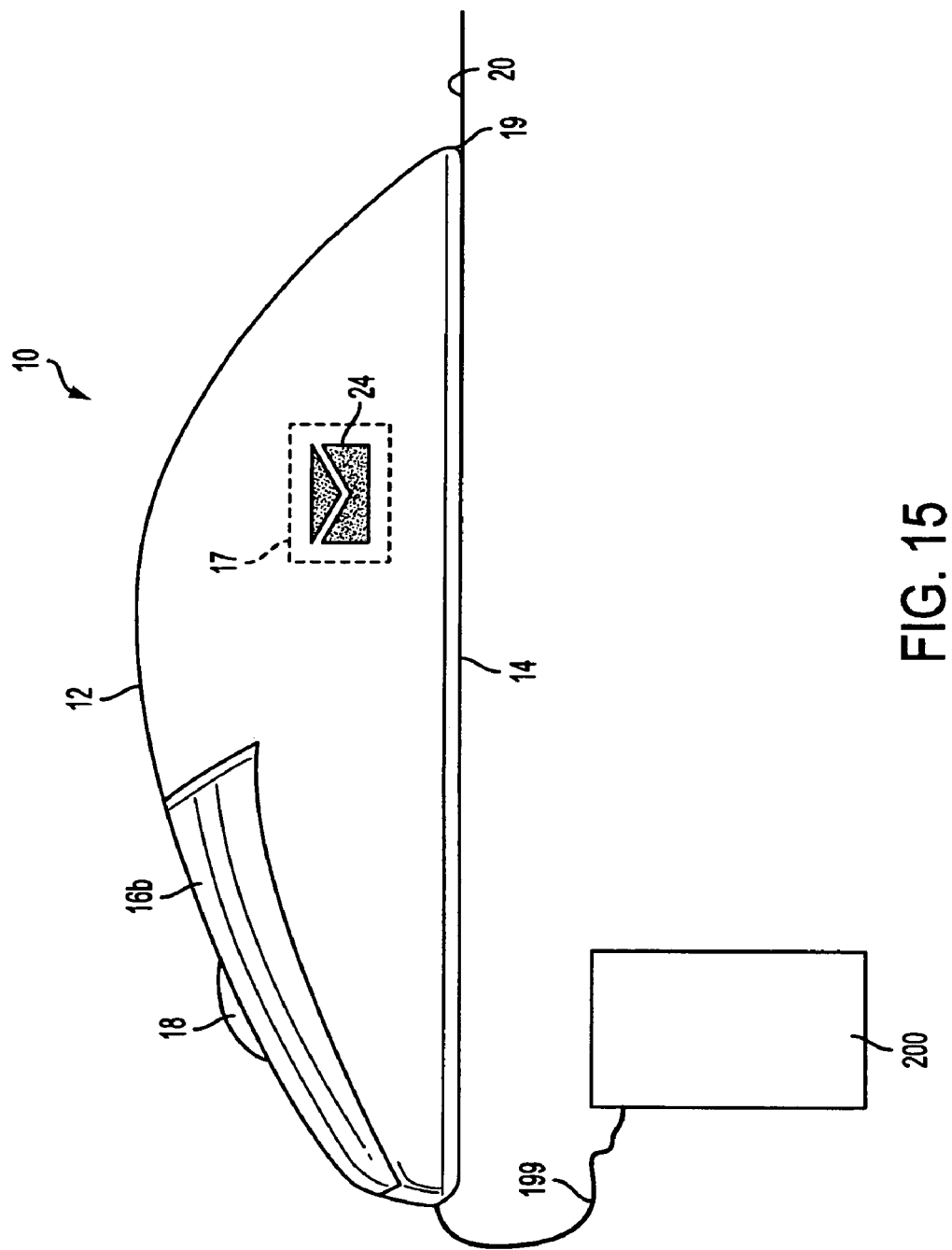
FIG. 15 is a side view of an electronic mouse type computer input device having an image projection system utilizing a wall of the housing as a display surface.

In the embodiments of 15-18*b*, the image projecting systems 30 are similar to the image projecting systems 30 described above except that the displayed image 24 is cast onto an internal side of a wall surface 17 of the mouse 10 in lieu of the supporting surface 20. For example, FIG. 15 illustrates the mouse 10 with an image projecting system 30 wherein the image 24 is displayed on a wall portion 17 of the housing 12 of the mouse 10. The wall portion 17 of the housing 12 is made from any desirable material as long as the image 24 from image projecting system 30 is visible when looking at the external surface of the wall portion 17. In one arrangement, the wall portion 17 is made from a partially translucent plastic material to aid in the visibility of the image 24 being displayed. In another embodiment, the wall portion 17 is made from a transparent plastic material with a frosted effect also to aid in the visibility of the image 24 being displayed. The remainder of the upper body 13 may be from the same material and/or have the same appearance as wall portion 17, or may be of a different color or opacity to make the wall portion 17 stand out.

Figure 16:
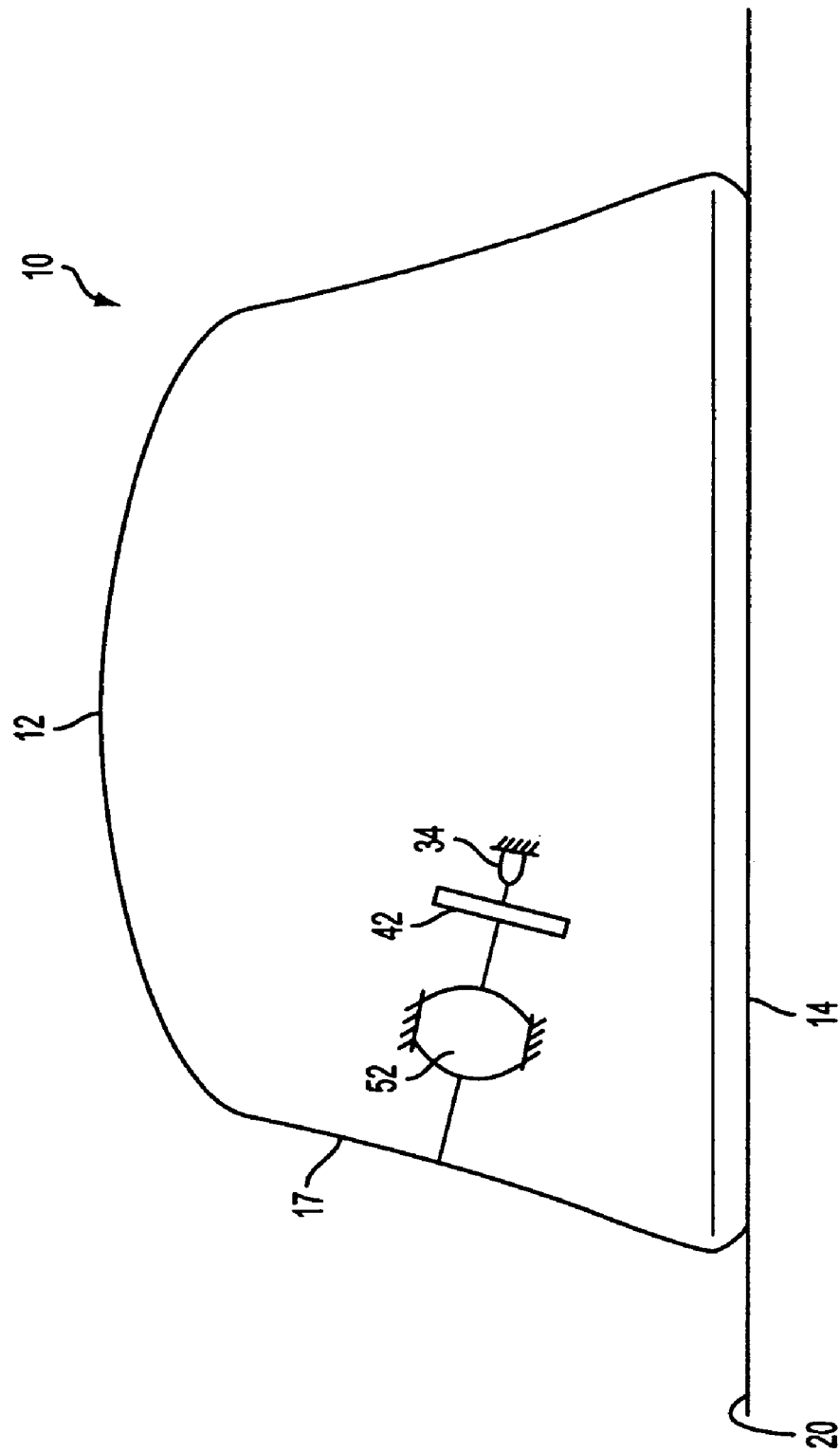
FIG. 16 is a schematic partial rear side sectional view of the electronic mouse of FIG. 15 showing a first image projection system.

In one arrangement, as shown in FIG. 16, the image projecting system 30 is substantially similar to the image projecting system 30 of FIG. 4 in that a light source, e.g., LED 34, emits light that passes through a pattern light blocker 42. The remainder of the light does not pass through the pattern light blocker 42 due to the light blocking section 42a. The beam portions of light that pass through the light permissive sections 42b passes through the lens 52 where it is focused as desired onto the wall surface 17 to form the desired displayed image shape 24.

Figure 17:
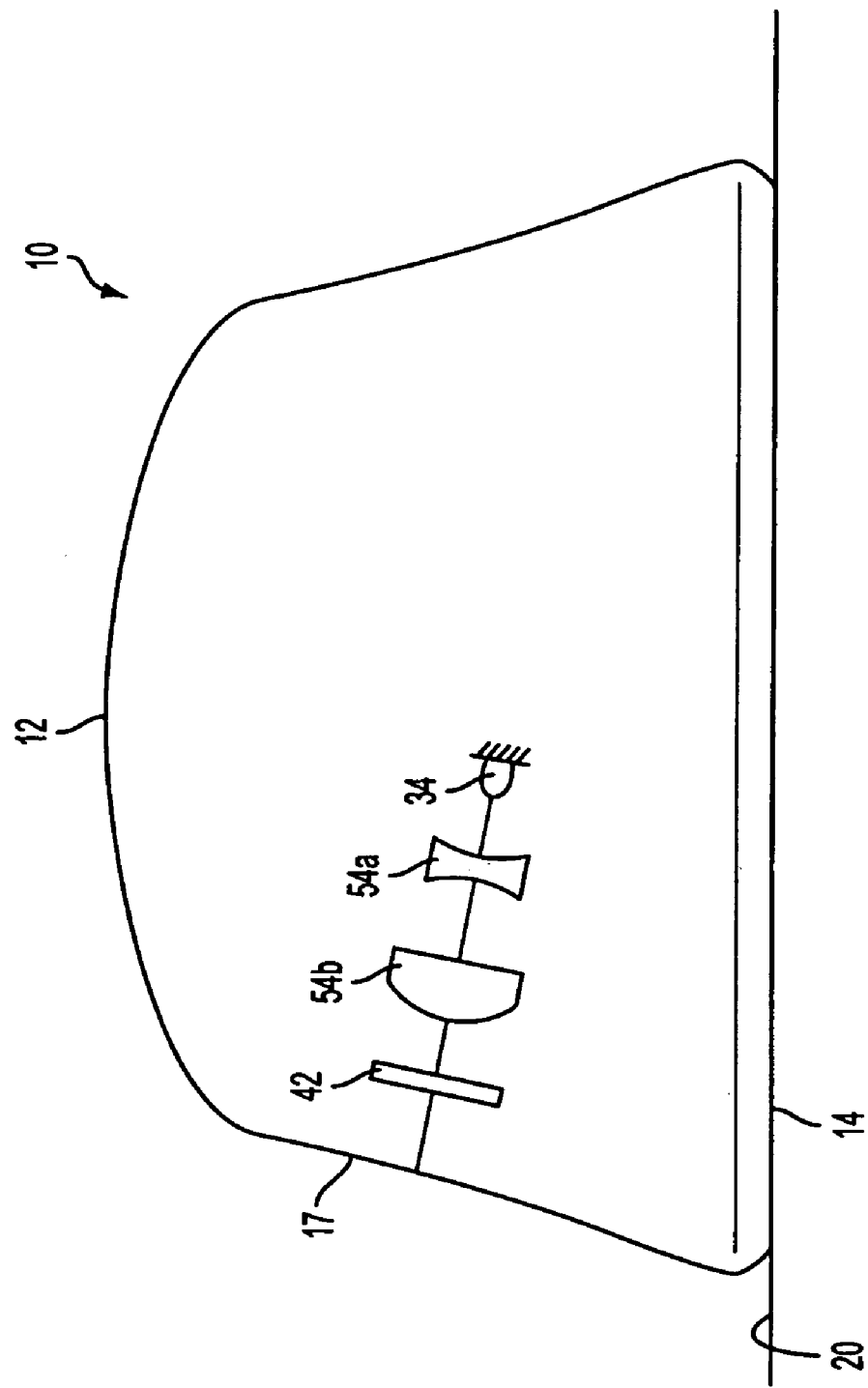
FIG. 17 is a schematic partial rear side sectional view of the electronic mouse of FIG. 15 showing an alternative image projection system.

In another arrangement, as shown in FIG. 17, the image projecting system 30 is substantially similar to the image projecting system 30 of FIG. 9 in that a light source, e.g., LED 34, emits light that passes through optical elements, e.g., lenses 54a and 54b, to collimate the beam. The collimated light then passes through a pattern light blocker 42. The beam portions of light that pass through the light permissive sections 42b hits the wall surface 17 to form the desired displayed image shape 24.

As with the embodiments that shine the image 24 on the supporting surface 24, the embodiments of the FIGS. 15-17 may include a movable holder (e.g., holders 44 or 48) containing plural pattern light blockers 42 to enable alternative images 24 to be displayed.

Figure 18A:
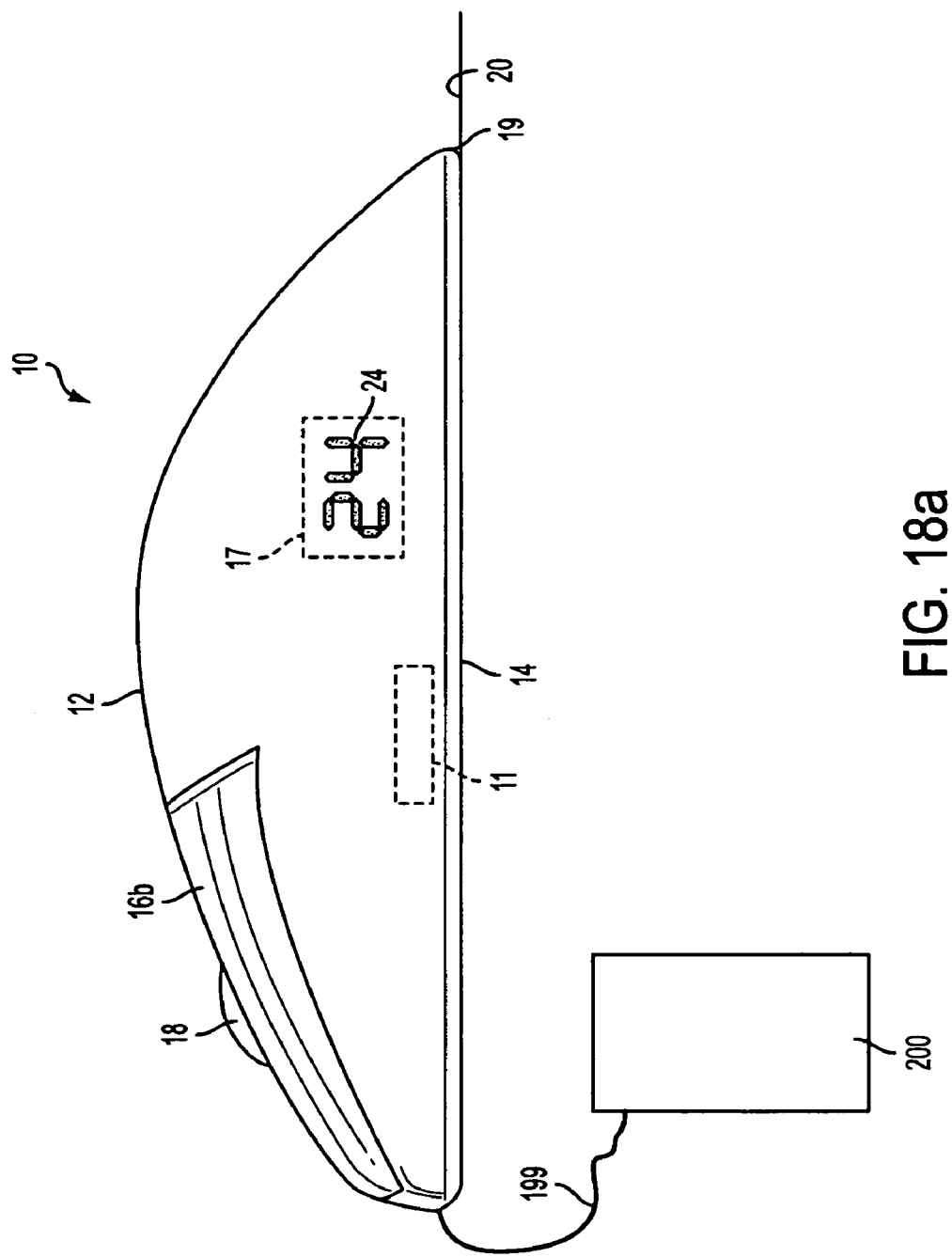
FIG. 18a is a side view of an electronic mouse type computer input device having an alternative image projection system utilizing a wall of the housing as a display surface.

In another arrangement, as shown in FIGS. 18a and 18b, the image projecting system 30 is substantially similar to the image projecting system 30 of FIGS. 12-14 in that an active LED matrix display 60 displays alphanumeric characters and that optical elements such as one or more lenses can focus the emitted light to a desired image size. In this arrangement, however, the alphanumeric characters 24 are displayed on the wall surface 17 of the mouse 10.

While the arrangements illustrate the images 24 being displayed on the side wall surface of the mouse 10, the image projecting system 30 and housing 12 may be configured and oriented to cast the image 24 on housing 12 wall at any desired position relative to the mouse 10, including other side regions, the rear surface regions, or the top surface regions.

While the light source as described in the embodiments above is an LED 34, the LED 34 may be a multi-color LED, or may be any desired color such as red, yellow, or green. The color (in a multi-color LED) and the intensity as well as whether the light is to remain on consistently or intermittently may be programmable by any known method. For example, in one arrangement, signals from the computer based on a user's input can select preferences of these parameters. Further, the light source need not be an LED, and may be an incandescent light member. In another embodiment, not depicted herein, the light source for the image projection system 30 emanates from a portion of the light from an optical tracking system, such that light from a single LED can be split to perform both functions. Additionally, the Active LED matrix display 60 may be any desired color, such as red, yellow, or green.

It is further recognized the elements within the housing 12 are shown schematically and not as mounted by any specific hardware arrangement. Any suitable mounting arrangement for these elements may be used and may also depend on the housing design and the other characteristics and features of the mouse 10.

The lenses 52, 54a, and 54b described herein are preferably made from a plastic such as polycarbonate, acrylic, or polystyrene, or from a glass such as SF11 or SF5. The lenses may be disposed to be an integral window through the housing 12 or may be disposed in the optical passageway.

In an alternative embodiment of an image projecting system 30, a laser may be used as the light source. In such an arrangement, a diffractive optical element may be, but need not be, provided in lieu of the pattern light blocker 42. The laser, and pattern light blocker 42 or diffractive optical element work in conjunction with one another to form a pattern out in space that may be displayed on the supporting surface 20 or on a wall portion 17 of the housing 12.

In another alternative embodiment of an image projecting system 30, a back-lit LCD arrangement could be used similar to what is used in projector systems. In such an arrangement, a light from behind an LCD element is used to shine through the LCD. The LCD is controlled such that selective pixels allow Red/Green/Blue wavelengths to pass through. If desired, the pixels may include interlaced RGB filters which are addressed electronically. The image may then be cast upon the inside surface of the housing or on a supporting surface as shown in the figures.

It is again noted that while the depicted embodiments are of a computer mouse 10, other embodiments include the image projection systems 30 described herein in trackball devices, keyboards, scanners, and other computer peripheral devices.

Operating Environment

Figure 19:
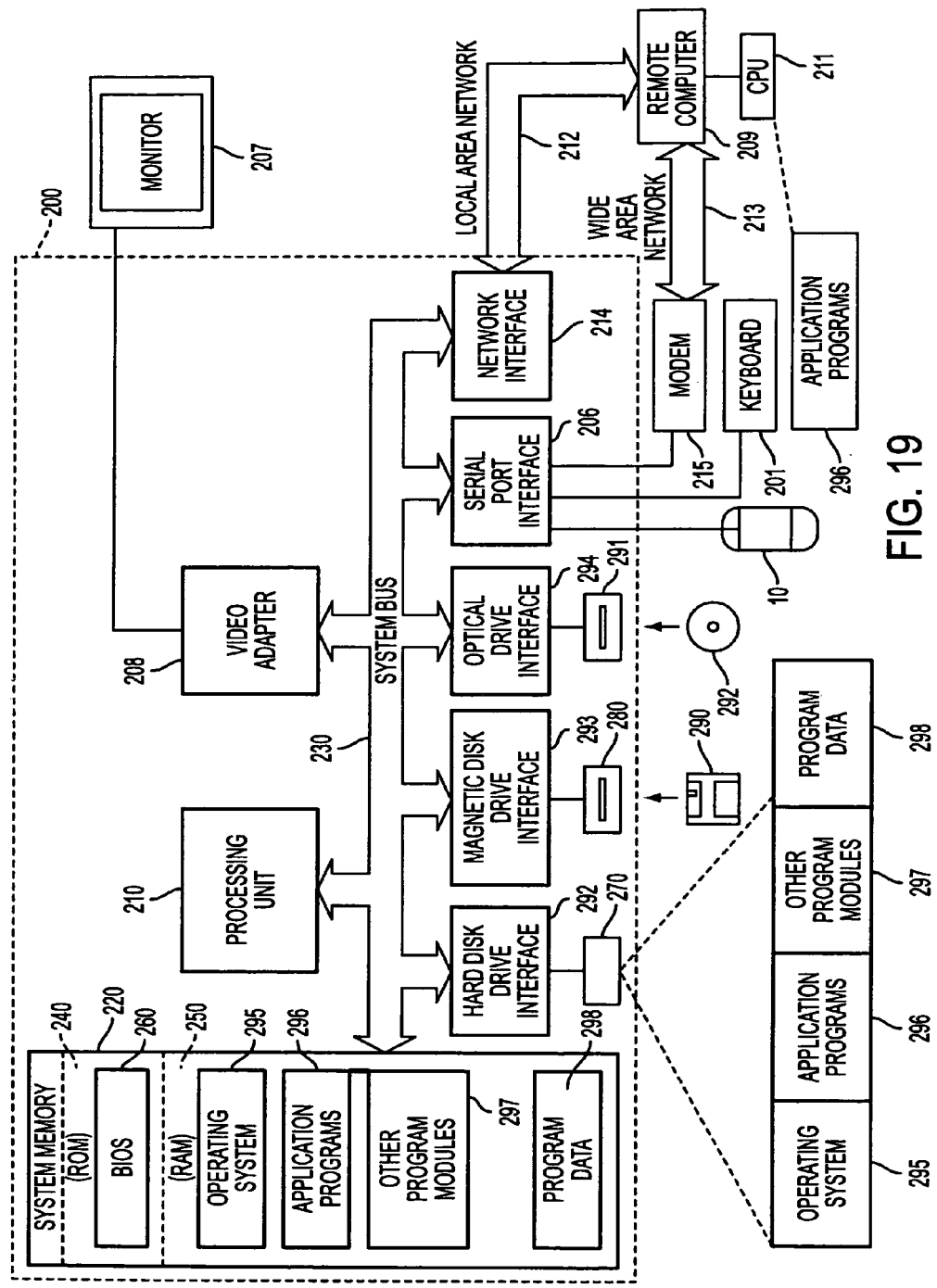
FIG. 19 is a schematic view illustrating an exemplary operating embodiment for the computer input device.

FIG. 19 is a schematic diagram of a computing environment in which the computer peripheral device 10 having the optical projection system may be implemented. The present invention may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disc drive 270 for reading from and writing to a hard disk, not shown, a magnetic disk drive 280 for reading from or writing to a removable magnetic disk 290, and an optical disk drive 291 for reading from or writing to a removable optical disc 292 such as a CD ROM or other optical media. The hard disk drive 270, magnetic disk drive 280, and optical disc drive 291 are connected to the system bus 230 by a hard disk drive interface 292, a magnetic disk drive interface 293, and an optical disc drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disc 292, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 290, optical disc 292, ROM 240 or RAM 250, including an operating system 295, one or more application programs 296, other program modules 297, and program data 298. A user may enter commands and information into the personal computer 200 through input devices such as a keyboard 201 and pointing device 10. The pointing device is preferably an embodiment of the electronic mouse device 10 as previously described. Other input devices (not shown) may include a microphone, joystick, game pad, satellite dish, scanner, or the like. These and other input devices are often connected to the processing unit 210 through a serial port interface 206 that is coupled to the system bus 230, but may be connected by other interfaces, such as a parallel port, game port or a universal serial bus (USB). A monitor 207 or other type of display device is also connected to the system bus 230 via an interface, such as a video adapter 208. In addition to the monitor, personal computers typically include other peripheral output devices (not shown), such as speakers and printers.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 19. The logical connections depicted in FIG. 19 include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local area network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, application programs 296 depicted relative to the personal computer 200, or portions thereof, may be stored in the remote memory storage device. It will be appreciated that the network connections shown are exemplary and other means of establishing a communications link between the computers may be used.

Figure 20:
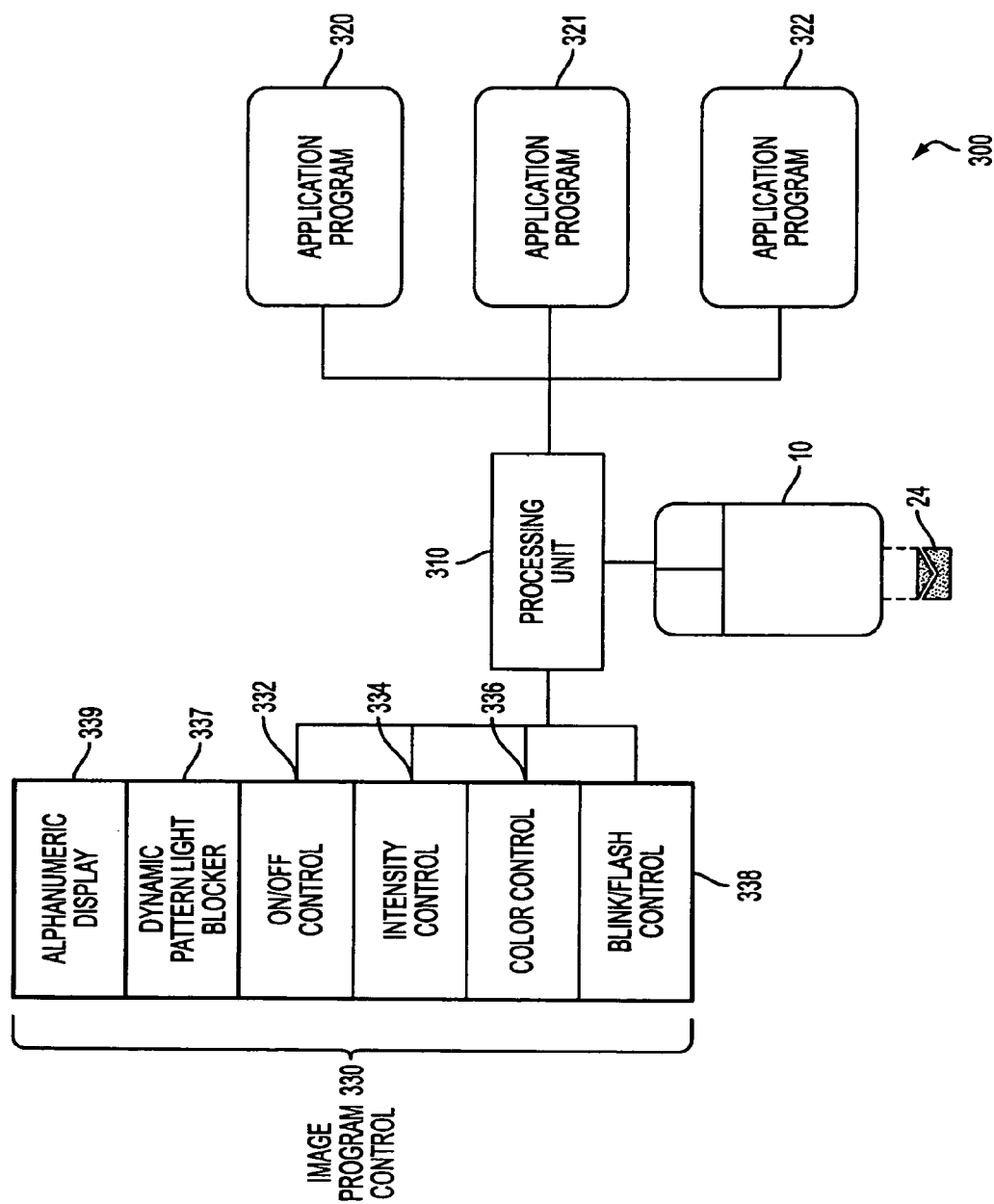
FIG. 20 shows a schematic diagram depicting a relationship between various computer application programs and the computer input device for controlling an illumination member on the computer input device.

In one arrangement, as shown in FIG. 20, computer processing unit 310 may be coupled to an image program control 330 to control the appearance of image 24. Such states may include: (1) whether the image 24 is visible; (2) the degree of illumination (i.e., the light intensity or amount of lumens) of the image 24; (3) the color of the image 24 (if the light source is a multi-colored LED or other device permitting changes in color; (4) the blinking or flashing of the image 24 (and blinking or flashing sequences); (5) the selected on of a predetermined number of graphical patterns of the image 24 (if a dynamic pattern light blocking system is used; and/or (6) the specific alphanumeric characters displayed (if the active LED matrix 60 is used). These states may be affected by program routines 332, 334, 336, 338, 337, and 339 respectively. Specifically, the image 24 can be controlled between being in a visible state and not being in a visible state by controlling the light source (e.g., LED 34 or active matrix 60) to be ON or OFF. The degree of illumination of the image 24 (i.e., the light intensity or amount of lumens) can be controlled by controlling the current and/or power to the light source. If the light source multi-colored LED or other device permitting changes in color, the color of the image can be controlled by any suitable method based on the type of multi-colored light source. The image 24 can be made to blink or flash by controlling the blinking and flashing of the light source. If the image projection system 30 includes a dynamic system with multiple pattern light blockers 42 such as shown in FIGS. 5-8, the shape of the image 24 to be displayed can be controlled by sending a command to the motor 45 or actuator 49 to change the current pattern light blocker 42 by rotating or translating the holder 44 or 48. If the active LED matrix 60 is used, the specific alphanumeric characters displayed in the image 24 can be controlled by providing data in the form accepted by the specific active LED matrix 60. The control program 330 and its routines 332, 334, 336, 337, 338, and 339 may be separate programs or routines or part of any other program such as a driver for a mouse or a trackball. If desired, the user can be given the option of overriding the changing of the states.

If desired, states for the image 24 may be controlled by the computer 300 in response to an event or occurrence, a condition, or any other activity relating to an application 320-322 being run by the computer 300. While three such programs 320-322 have been shown, it is recognized that the display of the image 24 may be controlled in accordance with any number of programs. Further, any desirable program or program type may be used to affect the states of the displayed image 24. Settings and defaults for the states may be controlled through any desirable interface. Power to the mouse 10 can be controlled by supplying or not supplying power to achieve a normally on or off state, and can be periodically switched off or on, respectively, in response to a particular condition.

This arrangement enables an occurrence, a state, or any other activity relating to any other program 320-322 being run by the computer 300 to cause the displayed image 24 to change states. This may be advantageous in using a number of programs, for example, programs relating to communication, scheduling, education, or games.

For example, this arrangement may be advantageous for users using communication programs relating to e-mail, voice mail, facsimile, and various conferencing techniques. Thus, the displayed image 24 may change states (including specific displayed shape, specific alphanumeric characters displayed, turning on or off, blinking or flashing, changing colors, and/or varying in intensity) in response to the receipt of an e-mail, voice mail, or facsimile message. For example, the motor 45 may be rotated to place the graphical depiction of the telephone in FIG. 6a in the optical line of sight so that the displayed image 24 is that of a telephone and the light member may be turned ON. Further, as most of these programs identify the sender of a message, a comparison can be performed to see if the sender of the message is a predetermined user or a user from a predetermined list. Based on the results of such a comparison, the displayed image 24 may change states if the message was sent from a particular user or a user in a particular group.

Additionally, this arrangement can assist the user by indicating activity while he or she is away from the computer. For example, the image projection system 30 may be programmed to blink or flash or otherwise change the displayed image 24 as a function of the number of messages that has been received since the user left the computer (which can be measured from the last entered computer input), or as a function of the number of messages that has been received and not read or opened. Thus, a user can be notified that he or she has received two messages in his or her absence when the displayed image 24 blinks twice in succession, and if the image shaping device is dynamic, when the image of an envelope blinks twice in succession. The blinking may be timed between periods of being fully on or off.

Similarly, many other programs that interact between multiple users include a solicitation feature. Such programs include communication software for chat rooms, instant messaging, and video and/or audio conference calls. The displayed image 24 may change one or more states in response to the receipt of a solicitation to join a chat room, instant messaging, or a call. Additionally or alternatively, the displayed image 24 may change one or more states due to a notification that a user has entered a common program or system and is now capable of receiving a solicitation to join a chat room or call.

Further, alternatively or additionally, the displayed image 24 on the electronic mouse device 10 may change states in response to calendar and/or scheduling programs. The relationship between the changing of one or more states and an item on the calendar or scheduling program may be set to be either instantaneous to the time or date or may be set to provide an advance warning of the set time and date. For example, if the user has a 3:00 p.m. conference to attend, the illumination device can be set to change states at 3:00 p.m. or prior to 3:00 p.m. Further, the activation time for the changing of states in response to an item may be set on an item-by-item basis. For example, a user could program the image projection system 30 to have the image 24 change states 24 hours in advance of an important date. Further, if the image shaping device is dynamic, it can move the holder so that the graphical representation of a meeting setting, such as shown in FIG. 6a, is displayed and activated in a desired manner.

Further, the image projection system 30 may also interface with other types of programs to change one or more states in response to conditions or occurrences in the program to notify users of any desirable event or occurrence. For example, if the program is an educational, trivia, or child development related game, the displayed image 24 can be an encouragement tool to change states in response to the entry of a correct answer. For example, an image 24 corresponding to a graphical representation of a happy face, such as shown in FIG. 3c, may be displayed in response to a correct answer. Additionally, if the program is an adventure game, the displayed image 24 may change states when a character enters a dangerous area or situation. It may change states, when player has run out or is running out of a particular supply (e.g., food, money, or ammunition). For example, an image 24 corresponding to a graphical representation of a food, such as shown in FIG. 3e, may be displayed in response to a player being in need of food. It may change states in response to being in a given proximity with a desirable or undesirable object. For example, an image 24 corresponding to a graphical representation of a skull and cross bones may be displayed in response to a player being near danger. If the danger is significant, the displayed image of the graphical representation of a skull and cross bones may blink and/or change colors. Another alternative is to make the image 24 blink or flash, with the number of blinks corresponding to the number of lives remaining.

If the LED matrix display 60 is used, the display may scroll helpful alphanumeric data so that it is displayed to the user as a scrolling image 24 on the supporting surface 20 or on a wall 17 of the housing 12. In applying some of the examples above, the scrolling alphanumeric display image 24 may advise the user in a scrolling display of: (a) "4 VOICE MAILS"; (b) "MEETING IN 5 MIN"; (c) "CORRECT ANSWER"; (d) "LOW FOOD"; and (e) "DANGER".

Figure 21:
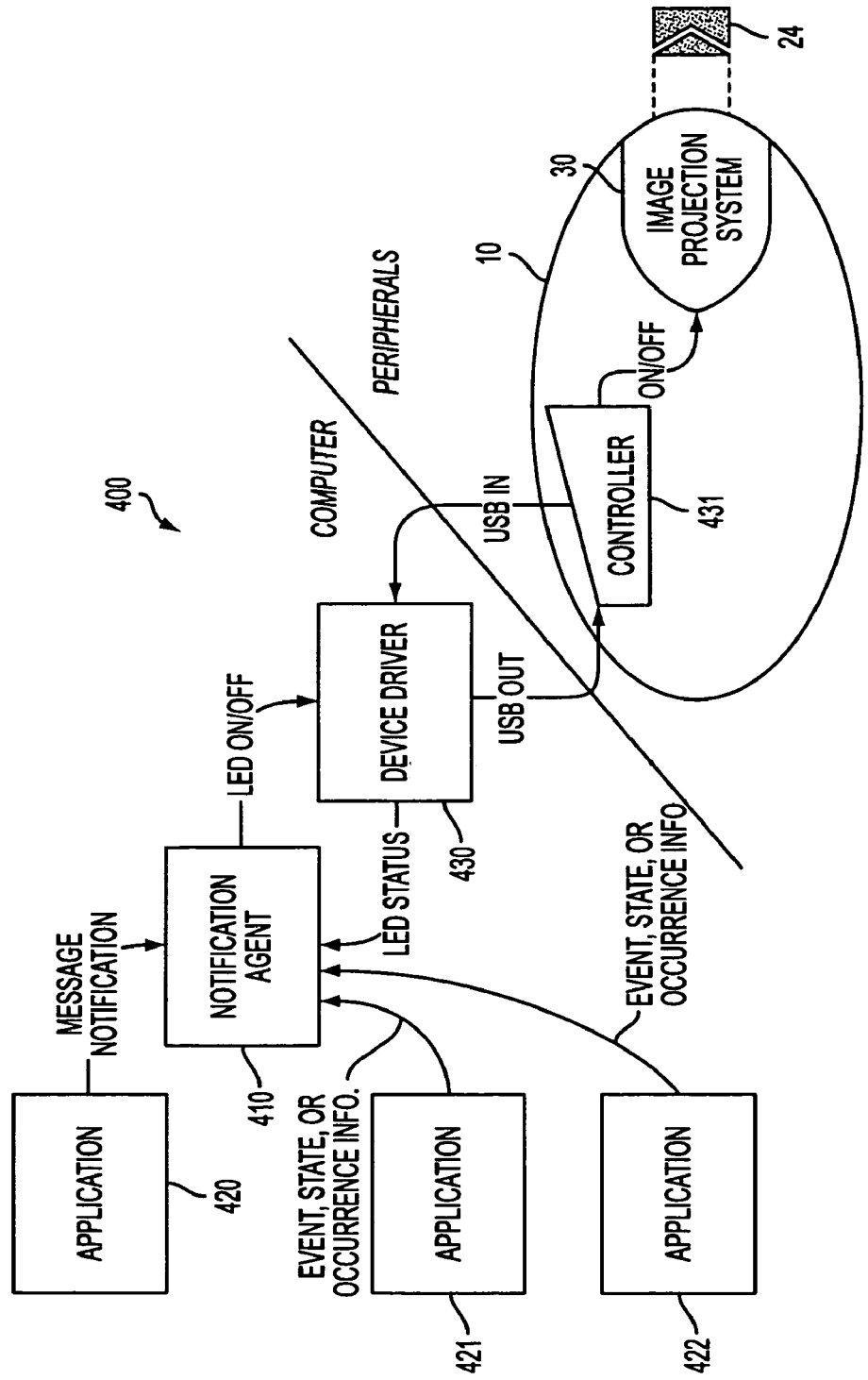
FIG. 21 shows an alternative schematic diagram depicting a relationship between various computer application programs and the computer input device for controlling an illumination member on the computer input device.

In an alternate configuration, as shown in FIG. 21, the computer 400 includes separate programs or routines for the input device driver 430 and the notification agent 410. These programs may be stored in a hard drive, or in a solid state memory, or downloaded from a network of computers, for example, from over the internet. In a manner known in the art, the electronic mouse device 10 is coupled to the device driver 430. In a preferred arrangement, mouse 10 is coupled to the device driver 430 via a Universal Serial Bus (USB) connection. The device driver 430 controls the "state" or "states" of the displayed image 24 based on events, and/or status or occurrence information relating to an application 420-422 derived or determined by notification agent 410. However, it is recognized that the notification agent 410 can be combined with the device driver 430 similar to the arrangement shown in FIG. 20.

The notification agent 410 may be referred to as the interface between the applications 420-422 and the computer input device driver 430 and determines events, occurrences, and status information relating to the applications 420-422 in any desired manner. Notification agent 410 interprets notification messages from specific applications 420-422 running on the computer 400. When a notification message is received, the notification agent 410 processes the messages and decides what instructions or commands to send to the device driver 430. The notification agent 410 will then send appropriate commands to the device driver 430 to change one or more of the states of the displayed image 24. The device driver 430 translates the control messages and sends the command over the Universal Serial Bus (USB) down to the device 10. The device 10 receives the message and executes the command that will affect the state of some type of the illumination member 14 on the device 10. In a preferred arrangement, the notification agent 410 makes use of a framework that enables a common mode of communication between applications. One commercially available product that furthers such a framework is called "ACTIVE X"® by Microsoft Corporation®.

In one example, the notification agent 410 interfaces with an e-mail program type of application 420. The notification agent 410 communicates with the e-mail program application 420 via an interface. As example of a system employing such an interface, is one using a Microsoft® "ACTIVE X"®, as previously mentioned, control to generate a notification message. When a new message is received, the notification agent 410 receives a trigger from the control and checks the number of new messages in the inbox of the e-mail program. The notification agent 410 changes the state of the illumination member 14 on the electronic mouse device 10 for every new message by sending an appropriate command to the device driver 430. In one desirable arrangement, for every new message, the notification agent 410 causes the displayed image 24 to blink, either rhythmically or non-rhythmically. The user can glance at the supporting surface 20 adjacent the mouse 10 or at a wall 17 of the mouse 10 note the number of new messages on the e-mail program application 420 by counting the number of times the image 24 blinks. Further, the image 24 displayed can also be changed to display the specific type(s) of received messages by displaying an image corresponding to, for example, an envelope, a facsimile machine, or a telephone. Examples of e-mail program applications are as Microsoft® "OUTLOOK"™, Novell® GROUPWISE™, or Lotus®

NOTES™, or any other electronic mail program that permits knowledge of the values in its fields or the existences of new messages. Alternatively, other communication systems may be used that generate similar messages. For example, other messaging system includes instant messaging system from AOL® and "MSN"™.

Figure 22:
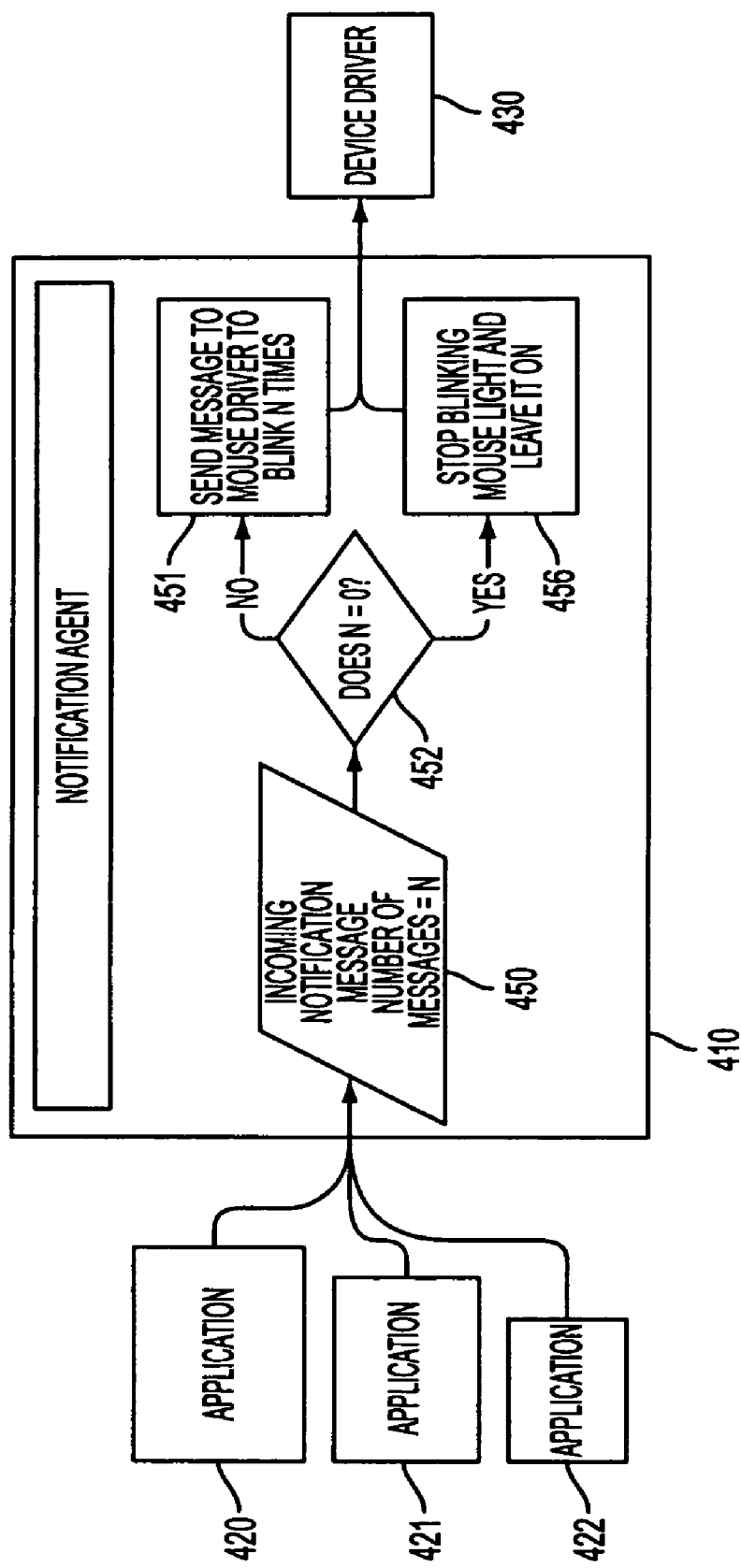
FIG. 22 shows a combined schematic diagram and flow chart of the notification agent.

In one method, as shown in FIG. 22, the notification agent 410, at step 450, interfaces with a field in an e-mail application 420 to determine the number of received and unopened e-mail messages, and assigns variable N to have that number. That number is then compared to 0 at step 452. If that number is 0, then step 456 will occur and there will be no command to change the state of the illumination member 14. Thus, the state of displayed image 24 will remain at its default of being ON. However, it is recognized that the default can be OFF. When the N is not equal to 0, a command is sent to the device driver 430 to blink N times, at step 451. This may be accomplished, by doubling that number N, and changing the states that many times. That is, the ON/OFF state of the displayed image 24 is changed 2N times. Thus, if N=1 and the light source is in the default ON state, the notification agent 410 sends two signals: a first signal to change the state of the display to OFF via the light source, followed by a second signal to change the state of the display to ON via the light source. If the number of unopened received messages is three, N=3, the state of displayed image 24 will be changed six times to produce three flashes. Predetermined delay periods or pauses can be used. Between flashes and/or between flashing cycles to create a desired flashing effects. To turn the displayed image 24 ON and OFF, a program routine can start off with a variable equal to 2N and decrease it by one each time through the cycle. When that variable is equally divisible by two, i.e., an even number, then a signal can be sent to turn the illumination member 14 ON, and when that variable is not equally divisible by two, i.e., an odd number, then a signal can be sent to turn the illumination member 14 OFF. While not depicted in FIG. 22, the notification agent 410 could run periodically run through the different types of notifications, e.g., emails, facsimiles, voice mails, meetings, etc., and change images and/or other image states as applicable. Alternatively, if an active LED matrix display 60 is used, this information can be scrolled as the display image 24.

While this is one method for blinking the displayed image 24, it is recognized that other methods may be used. Further, based on the level of detail and functionality of the device driver 430, a single command may be sent from the notification agent 410 to the device driver 430 which may be interpreted to make the displayed image 24 blink a single time or multiple times. Additionally, it is recognized that all or most of the functionality associated with the device driver 430 may be located in a controller 431 in the computer input device 10. If desired, the changing of states of the displayed image 24 may be programmed to cease upon a user input, such as the movement of a mouse-type computer input device relative to a supporting surface, upon the movement of a ball on a trackball-type computer input device, or the typing of a key on a keyboard-type computer input device until the receipt of a subsequent message.

The notification agent 410 may transmit a general command to the device driver 430 which interprets the command for the actual peripheral computer input device 10. Thus, is not necessary that the notification agent 410 know which specific computer input device 10 is used. Further, the notification agent 410 may be a program written in any desirable computer language including, but not limited to, Visual Basic, C++, and JavaScript.

The device driver 430 can control the ON or OFF state and/or the blinking of the displayed image 24 by known signal modulation techniques. Alternatively, the device driver 430 may control the displayed image 24 via a USB connection, as is known in the art. In another arrangement, as shown in FIG. 21, the computer input device 10, e.g., the trackball, keyboard, or mouse, includes a controller 431 coupled to the device, driver 430 and the image projection system 30. The controller 431 may be a microprocessor, circuitry, or any other suitable arrangement. In such an arrangement, the device driver 430 can send command signals to the controller 431 to change any of the states of the displayed image 24. The controller 431 recognizes such signals to change the state(s) of the displayed image 24 as described above.

As previously described, states for the displayed image 24 may be controlled by the computer 400 in response to an occurrence, a condition, or any other activity relating to any other program 420-422 being run by the computer 400. While three such programs 420-422 have been shown, it is recognized that illumination device 14 may be controlled in accordance with any number of programs. Further, any desirable program or program type may be used to affect the states of the displayed image 24. Settings and defaults for the states may be controlled through any desirable interface. Power to the mouse 10 can be controlled by supplying or not supplying power to achieve a normally on or off state, and can be periodically switched off or on, respectively, in response to a particular condition.

This arrangement enables an occurrence, a state, or any other activity relating to any other program 420-422 being run by the computer 400. This may be advantageous in using a number of programs, for example, programs relating to communication, scheduling, education, or games.

The displayed image 24 enables the mouse 10 or any other computer input device to be used as an output device as well. The displayed image 24 can present information to the user relating to an application running on the computer. This presentation of information by changing the states of the displayed image 24 enables the user to be notified from various positions even when the monitor screen is at a bad angle in the event that the supporting surface 24 or the wall surface 17 of the mouse 10 are visible.

The phrase "predetermined event" as used herein means an event associated with the operation of a computer application and excludes the normal powering on and off of the computer.

The phrase "communication application" as used herein means a computer application that enables text, video, or audio communication between a user and at least one of another user, computer, or network of computers. Examples of communication applications include, but are not limited to, applications for enabling e-mail communicating, voice mail communicating, facsimile communicating, video and/or audio conferencing, and instant messaging.

As previously described, the image projection system 30 is incorporated into other types of computer-related devices within the scope of the present invention. For example, non-depicted embodiments include, but are not limited to, a trackball, a touch pad, a keyboard, a digital tablet, a pointing stick, and a joystick. It is recognized that the embodiments with the mouse, a trackball, a touch pad, a digital tablet, a pointing stick, and a keyboard having a touch pad, rotatable ball, pointing stick or alternatives thereto, are configured and equipped to serve as pointing devices that allow a user to input spatial data to a computer or other processing device.

The term "trackball device" is commonly used to refer to a computer input device having a body and a rotatable ball coupled to the body for direct manual engagement by a user when the trackball device is resting on a supporting surface. A motion sensing system detects movement of the rotatable ball relative to the body. The term "track-mouse device" as defined and used herein means a computer input device being a mouse or a trackball device.

Thus, while there have been shown and described features of the present invention as applied to preferred embodiments thereof, it will be understood that various omissions and substitutions and changes in the form and details of the devices illustrated, and in their operation, and in the method illustrated and described, may be made by those skilled in the art without departing from the spirit of the invention as broadly disclosed herein.

What is claimed is:

1. A cursor control device configured to rest on a supporting surface, comprising:
   a housing having a lower periphery;
   a communication interface configured to connect the cursor control device to a computer system and to receive a signal from the computer system corresponding to an event occurring in a computer application running on the computer system; and
   an image projection system configured to display an image on the supporting surface adjacent to, outside of, and away from the lower periphery of the cursor control device when the cursor control device is resting on the supporting surface, wherein the image is displayed by the image projection system in response to the signal received from the computer system and is based on the computer application and the event.

2. The cursor control device of claim 1, wherein the image projection system is substantially contained within the housing.

3. The cursor control device of claim 2, wherein the image projection system includes a light source, a light blocker having a light transmissive portion and a light blocking portion, and a lens.

4. The cursor control device of claim 3, wherein the image projection system further includes a mirror disposed in a light path between the light source and the displayed image.

5. The cursor control device of claim 3, wherein the light blocker is optically located between the light source and the lens.

6. The cursor control device of claim 3, wherein the lens creates a focal point for the displayed image located substantially on the supporting surface.

7. The cursor control device of claim 3, wherein the lens is optically located in a light path between the light source and the light blocker.

8. The cursor control device of claim 2, wherein the image projecting system includes a light blocker and optics configured to enable the introduction of collimated light to the light blocker.

9. The cursor control device of claim 2, further comprising multiple predetermined image forming devices disposed within the housing, each image forming device producing a different displayed image.

10. The cursor control device of claim 9, further comprising a device for moving the image forming devices relative to an optical path.

11. The cursor control device of claim 10, wherein the device for moving the image forming devices is configured to linearly move the image forming devices.

12. The cursor control device of claim 10, wherein the device for moving the image forming devices is configured to rotatably move the image forming devices.

13. The cursor control device of claim 1, wherein the cursor control device is a mouse.

14. The cursor control device of claim 13, wherein the image projecting system includes an active LED matrix.

15. The cursor control device of claim 1, wherein the cursor control device is one of a trackball, mouse, and keyboard.

16. The cursor control device of claim 1, wherein the cursor control device is a pointing device.

17. The cursor control device of claim 1, wherein the cursor control device includes a motion detecting system.

18. The cursor control device of claim 1, further comprising an aperture in the housing, and wherein an optical path defined between a light source and the displayed image extends through the aperture.

19. The cursor control device of claim 1, wherein the image projection system includes a laser.

20. The cursor control device of claim 1, wherein the cursor control device is packaged as a kit with multiple replaceable image forming devices.

21. The cursor control device of claim 20, further comprising a light source and a light path extending from the light source to the displayed image, wherein each of the multiple replaceable image forming devices is removably attachable within the light path.

22. The cursor control device of claim 1, further comprising a light source and a light path extending from the light source to the displayed image, wherein each of the multiple replaceable image forming devices is a removable overlay accessible from an exterior of the housing.

23. The cursor control device of claim 1, wherein the computer system comprises a display screen, and wherein the image projected by the cursor control device is different than the image displayed contemporaneously on the display screen.

24. The cursor control device of claim 1, wherein the housing has a substantially flat bottom surface.

25. The cursor control device of claim 24, wherein the image includes an edge adjacent to the lower periphery, and wherein the image projection system is configured and oriented so that the adjacent edge of the image is within 1 mm and 25 mm from the lower periphery.

26. A computer mouse comprising:
   a housing;
   a plurality of actuators;
   a communication interface configured to connect the mouse to a computer system and to receive a signal from the computer system corresponding to an event occurring in a computer application running on the computer system;
   a motion detecting system for determining relative movement of the mouse;
   an optical projection system including a light source and a movable image forming element located within the housing, wherein in response to the signal received from the computer system the optical projection system is configured to project an image based on the computer application and the event; and
   wherein the mouse is configured to rest on a supporting surface and the optical projection system is configured to project an image onto the supporting surface.

27. The computer mouse according to claim 26, wherein the optical projection system includes an LED, a mirrored surface, and optics.

28. The computer mouse according to claim 27, wherein the optical projection system includes an LED and collimating optics.

29. The computer mouse according to claim 26, wherein the optical projection system includes an array of LEDs.

30. A method of notifying a user of an occurrence via a cursor control device configured to project images, the method including the steps of:
   projecting a first image onto a display region via a cursor control device in communication with a computer system;
   receiving a signal form the computer system corresponding to an event occurring in a computer application running on the computer system;
   in response to the signal received from the computer system, projecting a second image, different from the first image, onto the display region via the cursor control device wherein the second image is based on the computer application and the even; and
   wherein the display region is an area adjacent a housing periphery of the cursor control device such that the projecting steps include projecting the first and second images onto a supporting surface adjacent the housing periphery.

31. The method of claim 30, wherein the predetermined condition associated with the computer program corresponds to the receipt of an email message, a voicemail message, a facsimile message, or an instant messaging message.

32. The method of claim 31, wherein the second image corresponds to a number of received and unopened messages.

33. The method of claim 30, wherein the computer program is a scheduling program and the predetermined condition corresponds to a reminder of an upcoming scheduled appointment.

* * * * *